United States Patent
Mashiko

(10) Patent No.: US 11,681,251 B2
(45) Date of Patent: Jun. 20, 2023

(54) METHOD OF DETECTING IMAGE DEFECTS AND REPRINTING DEFECTIVE IMAGES, IMAGE FORMING APPARATUS, IMPLEMENTING THE METHOD, AND STORAGE MEDIUM

(71) Applicant: Yohta Mashiko, Tokyo (JP)

(72) Inventor: Yohta Mashiko, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/666,752

(22) Filed: Feb. 8, 2022

(65) Prior Publication Data

US 2022/0299922 A1    Sep. 22, 2022

(30) Foreign Application Priority Data

Mar. 19, 2021  (JP) .............................. JP2021-046490
Sep. 16, 2021  (JP) .............................. JP2021-151231

(51) Int. Cl.
*G03G 15/00*    (2006.01)
*G06F 3/12*    (2006.01)

(52) U.S. Cl.
CPC ......... *G03G 15/5012* (2013.01); *G06F 3/121* (2013.01); *G06F 3/1234* (2013.01); *G06F 3/1259* (2013.01)

(58) Field of Classification Search
CPC ............................................. G03G 15/5012
USPC ....................................... 358/1.12
See application file for complete search history.

(56) References Cited

U.S. PATENT DOCUMENTS

| | | |
|---|---|---|
| 2013/0250319 A1 | 9/2013 | Kaneko et al. |
| 2014/0079293 A1 | 3/2014 | Kitai et al. |
| 2014/0268259 A1 | 9/2014 | Kitai |
| 2014/0313538 A1 | 10/2014 | Kitai et al. |
| 2015/0269719 A1 | 9/2015 | Kitai |
| 2016/0274823 A1 | 9/2016 | Mashiko |
| 2017/0031636 A1 | 2/2017 | Kitai |
| 2020/0117135 A1 | 4/2020 | Asakawa |
| 2022/0083294 A1* | 3/2022 | Agehama ........... H04N 1/00692 |

FOREIGN PATENT DOCUMENTS

| | | |
|---|---|---|
| JP | 2008-160284 | 7/2008 |
| JP | 2014144627 A * | 8/2014 |
| JP | 6048664 | 12/2016 |
| JP | 2020-032729 | 3/2020 |

OTHER PUBLICATIONS

Extended European Search Report for 22156097.2 dated Jul. 26, 2022.

* cited by examiner

*Primary Examiner* — Jacky X Zheng
(74) *Attorney, Agent, or Firm* — IPUSA, PLLC

(57) ABSTRACT

An image forming apparatus includes processing circuitry. The processing circuitry receives a timing selected for re-forming an image and re-forms the image determined to be defective based on information about the image formed on a first conveyance medium, on a second conveyance medium at the selected timing.

15 Claims, 27 Drawing Sheets

FIG. 8

| ITEMS | REMARKS | INITIAL VALUE |
|---|---|---|
| JOB GENERATION SOURCE | DFE JOB, INTERNAL JOB | INITIALIZED BY GENERATION SOURCE |
| GENERATION TIME | TIME WHEN GENERATION SOURCE GENERATED JOB | INITIALIZED BY GENERATION SOURCE |
| PAGE ID | IDENTIFICATION INFORMATION OF PRINT PAGE, INCREMENTED BY ONE FOR OUTPUT OF EACH PAGE STARTING FROM ACTIVATION OF THE POWER SOURCE | 0 |
| PRINT FACE | ONE SIDE IN SINGLE-SIDED PRINTING, FRONT FACE IN DUPLEX PRINTING, BACK FACE IN DUPLEX PRINTING | INITIALIZED BY GENERATION SOURCE |
| SHEET ID | IDENTIFICATION INFORMATION OF PRINT SHEET, INCREMENTED BY ONE FOR OUTPUT OF EACH SHEET STARTING FROM ACTIVATION OF THE POWER SOURCE | 0 |
| COPY ID | IDENTIFICATION INFORMATION OF COPY UNIT, INCREMENTED BY ONE FOR OUTPUT OF EACH COPY STARTING FROM ACTIVATION OF THE POWER SOURCE | 0 |
| JOB ID | IDENTIFICATION INFORMATION OF JOB UNIT, INCREMENTED BY ONE FOR OUTPUT OF EACH JOB STARTING FROM ACTIVATION OF THE POWER SOURCE | 0 |
| SHEET TYPE | TYPE OF SHEETS | INITIALIZED BY GENERATION SOURCE |
| SHEET SIZE | SIZE OF SHEETS | INITIALIZED BY GENERATION SOURCE |
| JOB TYPE | TARGET OF DEFECT DETECTION, NON-TARGET OF DEFECT DETECTION, SLIP SHEET FOR DEFECT DETECTION IDENTIFICATION, RE-FORMATION | INITIALIZED BY GENERATION SOURCE |
| SLIP SHEET ID | SLIP SHEET ID NOTIFIED FROM INSPECTION DEVICE | INITIALIZED BY GENERATION SOURCE |
| ... | ... | ... |

FIG. 14

```
                                        ⌐906
    ┌─────────────────────────────────┐
    │        SLIP SHEET ID: 0001      │
    │                                 │
    │  <THE TOTAL NUMBER OF PAGES IN WHICH
    │  THE DEFECT IS DETECTED>        │
    │  1                              │
    │                                 │
    │  <INFORMATION OF THE PAGE IN WHICH
    │  THE DEFECT IS DETECTED>        │
    │  JOB ID: 1                      │
    │  COPY ID: 3                     │
    │  PAGE ID: 432                   │
    │  DEFECT DETECTION PAGE LOCATION:│
    │  171 PAGES BEFORE THIS PAGE     │
    │                                 │
    │                                 │
    │        SLIP SHEET ID: 0001      │
    │           (upside down)         │
    └─────────────────────────────────┘
```

FIG. 17

| INSPECTION PROCESSING START TIME | NUMBER OF COPIES OF JOB | NUMBER OF PAGES OF JOB | NUMBER OF DEFECT DETECTION PAGES OF JOB |
|---|---|---|---|
| 2020/11/13 15:03:05 | 25 | 121 | 5 |
| | | | |
| | | | |

| DEFECT DETECTION TIME | NUMBER OF DEFECTIVE COPIES OCCURRED IN JOB | NUMBER OF DEFECTIVE PAGES OCCURRED IN JOB | SLIP SHEET ID IMMEDIATELY BEFORE RE-FORMED PAGE | RELATION OF POSITIONS OF DEFECT DETECTED PAGE AND SLIP SHEET |
|---|---|---|---|---|
| 2020/11/13 15:19:01 | 3 | 25 | 0001 | 49 PAGES UNDER SLIP SHEET, LOWER SURFACE |
| 2020/11/13 15:19:51 | 3 | 78 | 0001 | 22 PAGES UPPER SLIP SHEET, UPPER SURFACE |
| 2020/11/13 15:55:43 | 25 | 16 | 0002 | 53 PAGES UNDER SLIP SHEET, LOWER SURFACE |

909

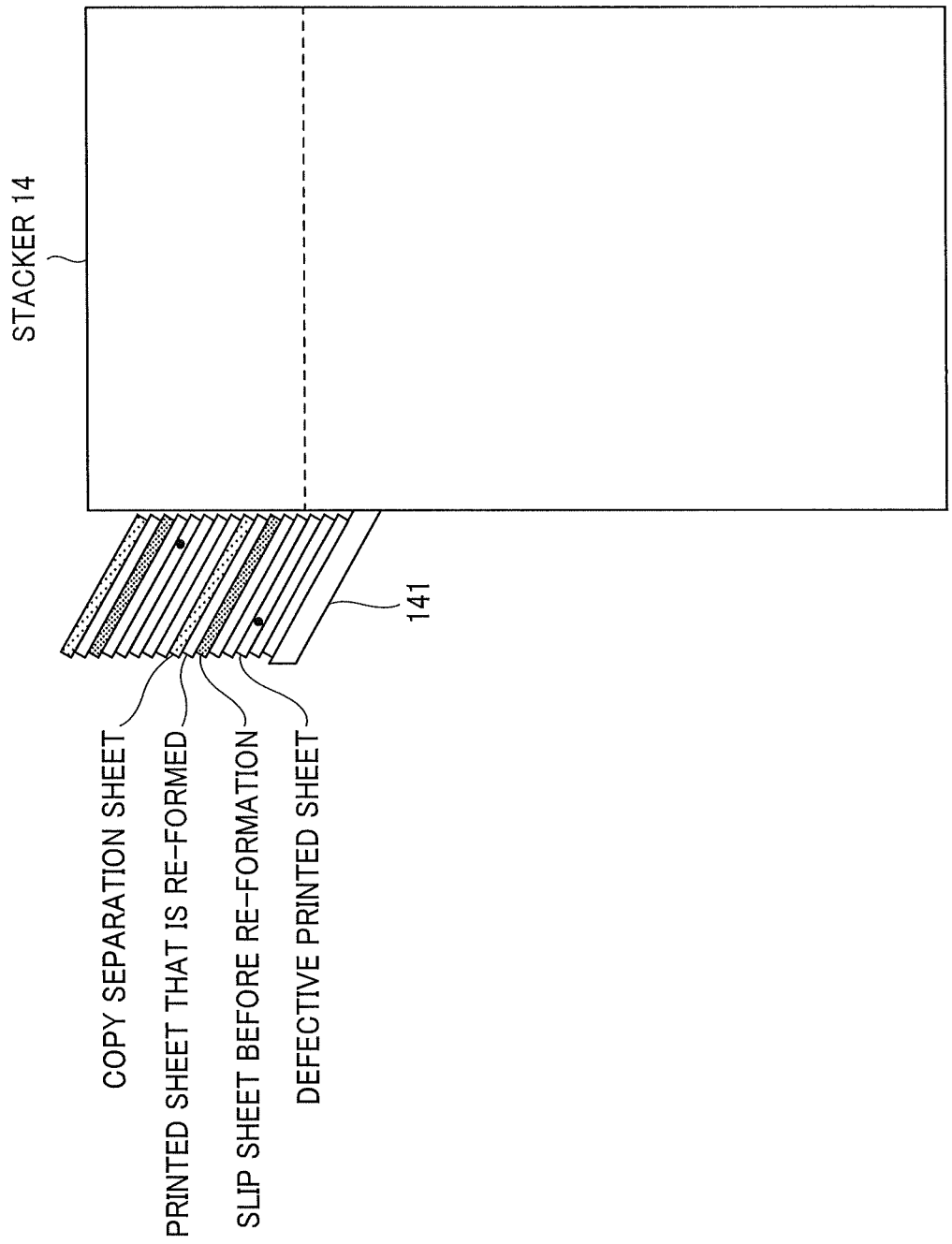

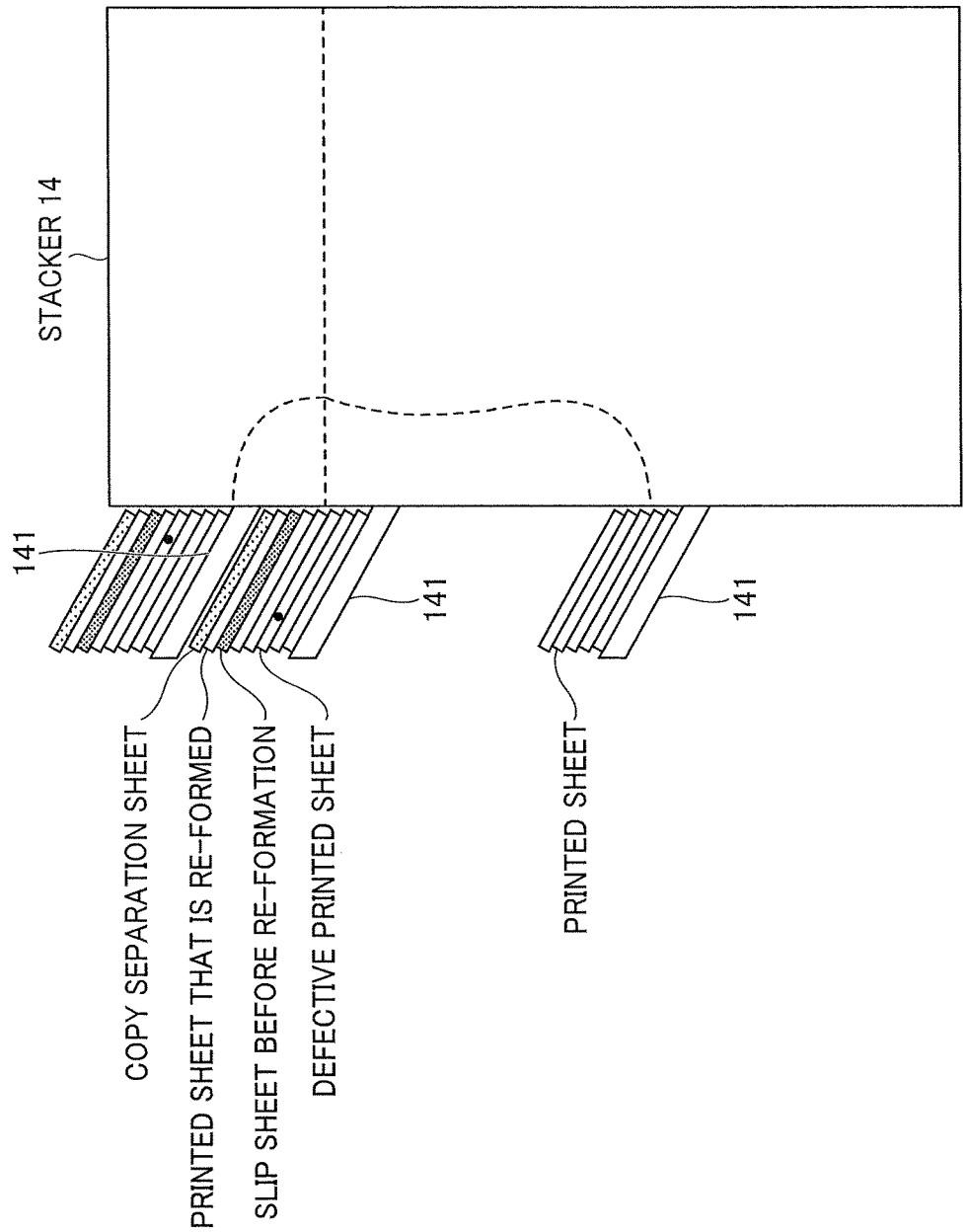

METHOD OF DETECTING IMAGE DEFECTS AND REPRINTING DEFECTIVE IMAGES, IMAGE FORMING APPARATUS, IMPLEMENTING THE METHOD, AND STORAGE MEDIUM

CROSS-REFERENCE TO RELATED APPLICATIONS

This patent application is based on and claims priority pursuant to 35 U.S.C. § 119(a) to Japanese Patent Application No. 2021-046490, filed on Mar. 19, 2021, and 2021-151231, filed on Sep. 16, 2021, in the Japan Patent Office, the entire disclosure of which is hereby incorporated by reference herein.

BACKGROUND

Technical Field

Embodiments of the present disclosure relate to an image forming apparatus, an image forming method, and a storage medium.

Related Art

Various technologies have been developed that detect a defect in an image formed by an image forming apparatus, based on a result of reading the image. Various technologies are also known that re-form an image in which a defect has been detected. For example, a technology of reprinting is known in a case in which the printing state of image information on a printing sheet is determined to be defective.

SUMMARY

Embodiments of the present disclosure described herein provide a novel image forming apparatus that includes processing circuitry. The processing circuitry receives a timing selected for re-forming an image and re-forms the image determined to be defective based on information about the image formed on a first conveyance medium, on a second conveyance medium at the selected timing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating items of job information, according to embodiments of the present disclosure;

FIG. 14 is a diagram illustrating an example of a slip sheet;

FIG. 17 is a diagram illustrating an example of a job list;

FIG. 18 is a diagram illustrating an example of a defect detection page list;

FIG. 27 is a diagram illustrating a method of ejecting sheets to a sheet ejection tray, according to an embodiment of the present disclosure; and FIG. 28 is a diagram illustrating a method of ejecting sheets to sheet ejection trays, according to an embodiment of the present disclosure.

Figure 1:
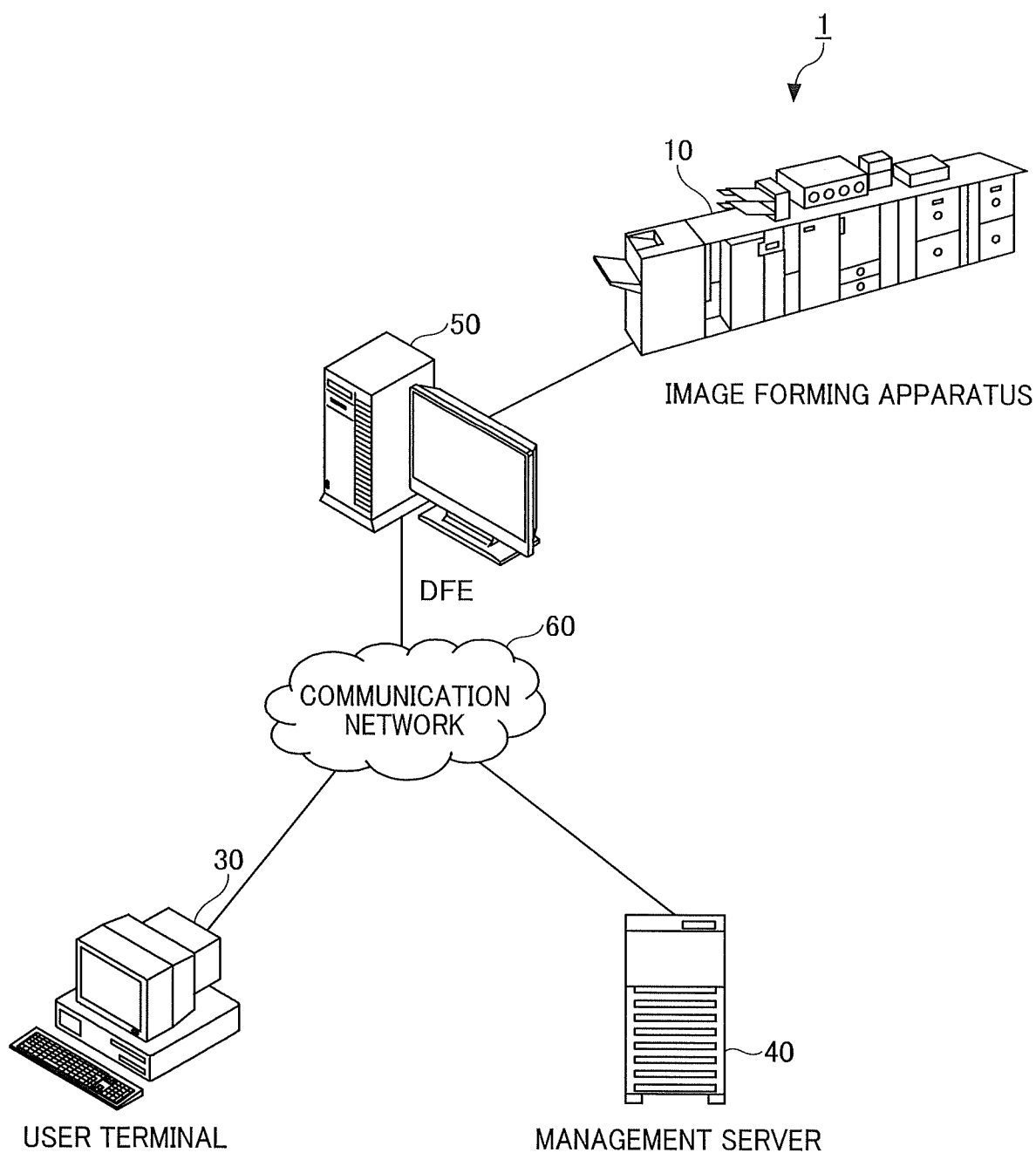
FIG. 1 is a diagram illustrating an overall configuration of an image forming system, according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Descriptions are given of an image forming system according to a first embodiment of the present disclosure, with reference to the drawings.

FIG. 1 is a diagram illustrating an overall configuration of an image forming system, according to embodiments of the present disclosure.

An image forming system 1 includes an image forming apparatus 10, a user terminal 30, a management server 40, and a digital front end (DFE) 50.

The image forming apparatus 10 is an apparatus that forms an image, and is, for example, a color production printer, a laser printer, or an inkjet printer. The image forming apparatus 10 receives image data from the DFE 50 and prints the image on a sheet based on the received image data. Note that "sheet" is an example of a conveyance medium on which an image is formed.

The user terminal 30 is a terminal that receives an operation from a user and instructs to print an image. Specifically, the user terminal 30 transmits print job data including image data to the DFE 50 or the management server 40. The user terminal 30 transmits information indicating a threshold in color stabilization processing to the DFE 50 in response to an operation of the user. In addition, the user terminal 30 receives display control by the DFE 50 and displays a screen indicating an execution status of the color stabilization processing.

The management server 40 adds the print job data as a queue to a memory that stores the print job data waiting for printing in response to the receipt of the print job data from the user terminal 30. The management server 40 extracts print job data from the queue in the order in which the print job data is added to the queue or in accordance with a priority set appropriately. Then, the management server 40 transmits the print job data to the DFE 50.

The DFE 50 is an apparatus that controls the image forming apparatus 10, for example, a DFE. The DFE 50 is communicably connected to the image forming apparatus 10, the user terminal 30, and the management server 40 via the communication network 60.

When the DFE 50 receives print job data with a signal that instructs to print the image from the user terminal 30 or the management server 40, the DFE 50 converts the print job data into image data in a format that is processed by the image forming apparatus 10, using a raster image processor (RIP) engine included in the image forming apparatus 10. Then, the DFE 50 transmits the converted image data to the image forming apparatus 10.

Figure 2:
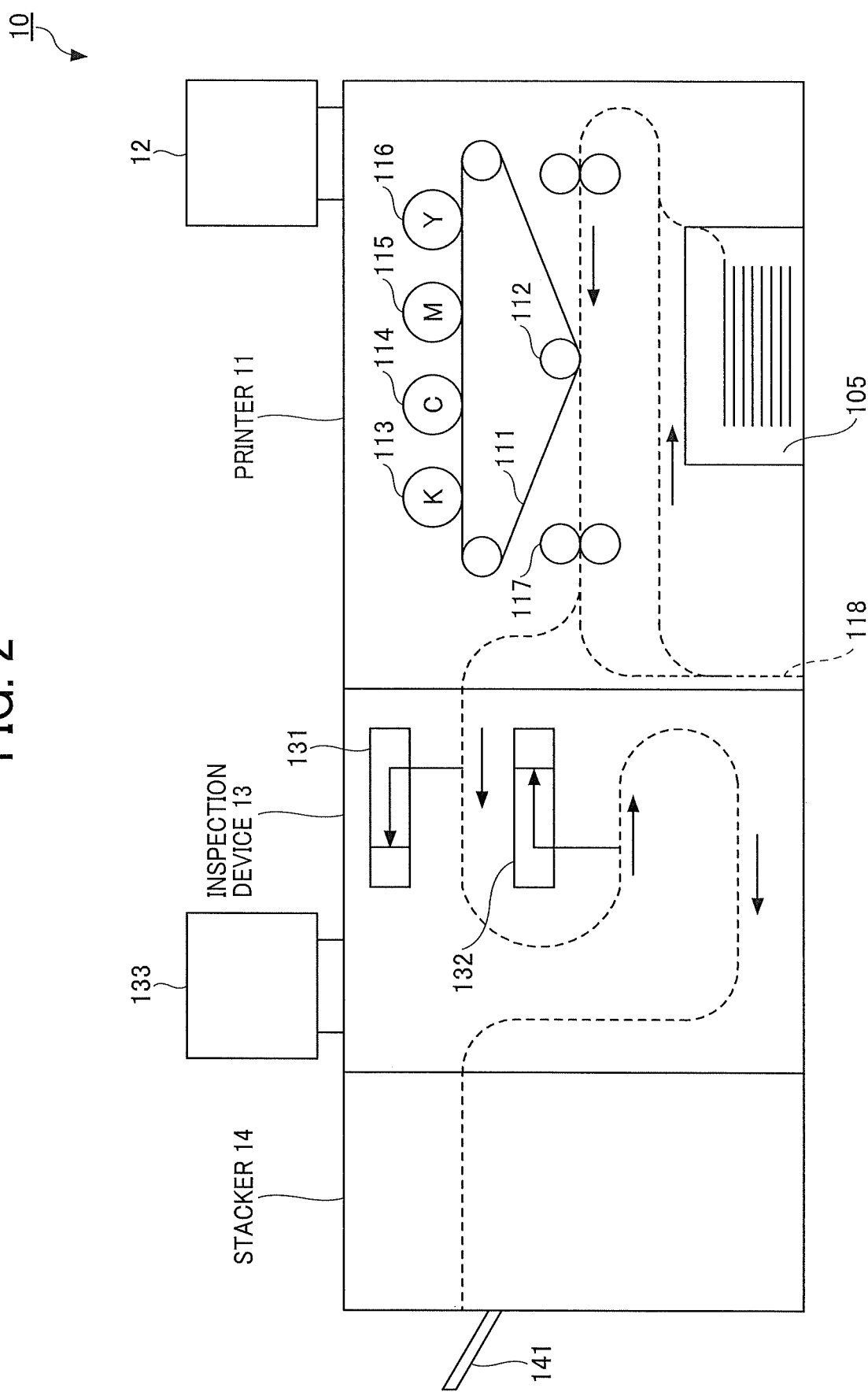
FIG. 2 is a diagram illustrating a hardware configuration of an image forming apparatus of the image forming system of FIG. 1.

FIG. 2 is a diagram illustrating a hardware configuration of an image forming apparatus of the image forming system of FIG. 1.

The image forming apparatus 10 includes a printer 11, an inspection device 13, and a stacker 14.

The printer 11 receives the print job data including a print image (rasterized image) from an external apparatus such as the DFE 50. Then, the printer 11 executes printing in response to an execution instruction based on the received print job data or an execution instruction based on the print job data stored in the printer 11 by a user's operation on an operation panel 12.

The printer 11 has a configuration in which photoconductor drums 116, 115, 114, and 113 are disposed along an intermediate transfer belt 111. The photoconductor drums 116, 115, 114, and 113 form yellow (Y), magenta (M), cyan (C), and black (K) toner images, respectively. The intermediate transfer belt 111 is a moving unit of an endless loop. Images of the respective colors are developed with toner on the respective surfaces of the photoconductor drums 116, 115, 114, and 113 and are transferred and superimposed one after another onto the surface of the intermediate transfer belt 111 to form a full-color image.

The full-color image borne on the intermediate transfer belt 111 is transferred onto the sheet by a transfer roller 112. The sheet is fed from a sheet feeding tray 105 and conveyed by a transfer roller 112. Then, the sheet is further conveyed, and the toner is fixed to the sheet by a fixing roller 117. Note that, when outputting a slip sheet without printing, another sheet feeding tray for the slip sheet, or a copy separation sheet may be provided separate from the sheet feeding tray 105. Further, a slip sheet feeding device may be provided in the inspection device 13 or between the printer 11 and the inspection device 13.

In the case of duplex printing, after the image is formed on the front side, the sheet is conveyed to a sheet reverse passage 118 in the sheet conveyance passage, then is reversed, and is conveyed again to the position of the transfer roller 112.

The inspection device 13 is a device that inspects printed sheets by the printer 11. Each of the printed sheets to be inspected is referred to as a first conveyance medium in the present disclosure. The inspection device 13 includes a first inline sensor 131, a second inline sensor 132, and an operation panel 133. The inspection device 13 may not include the operation panel 133. In this case, the inspection device 13 may be configured to receive an operation through the operation panel 12 of the printer 11 or a computer connected via a communication network.

The first inline sensor 131 and the second inline sensor 132 read the images fixed on both sides of the sheet by the fixing roller 117 and obtain read image data indicating the read images. The number of inline sensors is not limited to two and may be one or three or more as long as both sides of the sheet are read. An inline sensor includes a light source and a line image sensor. The light source irradiate light onto a sheet passing over a reading position. The line image sensor includes a plurality of imaging elements aligned one dimensionally in the width direction of a sheet. The plurality of imaging elements optically converts reflected light reflected on the sheet for each pixel to read the reflected light. The inline sensor reads an image printed on the sheet as a two-dimensional image by repeatedly performing an operation of reading the image for one line in the width direction of the sheet, in accordance with the sheet passing operation over the reading position. Further, the line image sensor captures read images of three colors of red, green, and blue (RGB). The inline sensor is an example of an information acquisition device that acquires information about the image on the sheet. The information acquisition device may acquire information other than the read image data as long as the information is information for detecting a defect such as image data or bibliographic information of the image data.

The stacker 14 includes a sheet ejection tray 141 and stacks printed sheets ejected from the printer 11 via the inspection device 13 on the sheet ejection tray 141. The stacker 14 and the sheet ejection tray 141 are configured to receive and stack the printed sheets and the slip sheets. The stacker 14 may have a plurality of sheet ejection trays 141.

The present embodiment is given providing that, for example, that the rasterized image is in the CMYK format (format in a subtractive color mode including cyan, magenta, yellow, and black) with 8-bit colors and 600 dpi resolution, and the read image is in the RGB format with 8-bit colors and 200 dpi resolution. However, embodiments of the present disclosure are not limited to the above-described data formats in image formation.

Figure 3:
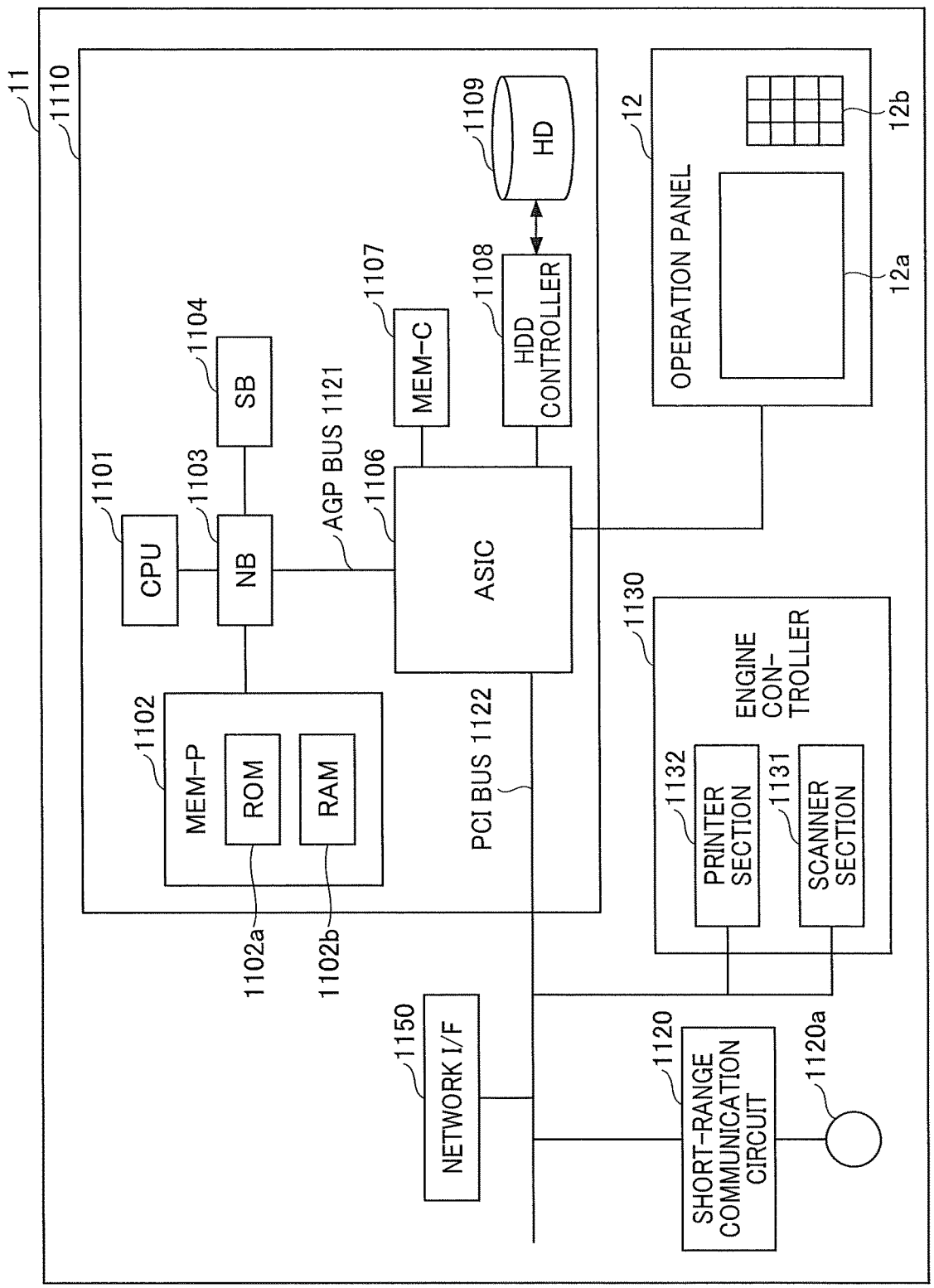
FIG. 3 is a diagram illustrating a hardware configuration of a printer of the image forming system of FIG. 1.

FIG. 3 is a diagram illustrating a hardware configuration of a printer of the image forming system of FIG. 1.

The printer 11 includes a controller 1110, a short-range communication circuit 1120, an engine controller 1130, the operation panel 12, and a network I/F 1150.

The controller 1110 includes a central processing unit (CPU) 1101 that is a main part of a computer, a system memory (MEM-P) 1102, a north bridge (NB) 1103, a south bridge (SB) 1104, an application specific integrated circuit (ASIC) 1106, a local memory (MEM-C) 1107 that is a memory unit, a hard disk drive (MD) controller 1108, and a hard disk (HD) 1109 that is a memory.

The NB 1103 and the ASIC 1106 are connected by an accelerated graphics port (AGP) bus 1121.

The CPU 1101 is a control device that performs overall control of the printer 11. The NB 1103 is a bridge configured to connect the CPU 1101, the MEM-P 1102, the SB 1104, and the AGP bus 1121. The NB 1103 includes a memory controller that controls reading from and writing to the MEM-P 1102, a peripheral component interconnect (PCI) master, and an AGP target.

The MEM-P 1102 includes a read only memory (ROM) 1102a and a random access memory (RAM) 1102b. The ROM 1102a is a memory to store programs and data for implementing various functions of the controller 1110. The RAM 1102b is a memory configured to deploy programs, data or to render print data for memory printing. The program stored in the RAM 1102b may be provided as a file in an installable format or an executable format that the program is recorded in a computer-readable storage medium such as a compact disc-read only memory (CD-ROM), a compact disc-recordable (CD-R), or a digital versatile disc (DVD).

The SB 1104 is a bridge configured to connect the NB 1103 to PCI devices and peripheral devices. The ASIC 1106 is an integrated circuit (IC) for image processing having a hardware element for image processing and has a role of a bridge that connects the AGP bus 1121, the PCI bus 1122, the HDD controller 1108, and the MEM-C 1107 to each other.

The ASIC 1106 includes a PCI target, an AGP master, an arbiter (ARB) serving as a core of the ASIC 1106, a memory controller that controls the MEM-C 1107, a plurality of direct memory access controllers (DMAC) that rotates image data by hardware logic, and a PCI unit that transfers data between a scanner section 1131 and a printer section 1132 via the PCI bus 1122. A universal serial bus (USB) interface or an Institute of Electrical and Electronics Engineers 1394 (IEEE 1394) interface may be connected to the ASIC 1106.

The MEM-C 1107 is a local memory used as a copy image buffer and a code buffer. The HD 1109 is a memory that stores image data, font data used in printing, and forms. The HD 1109 controls reading or writing of data from or to the HD 1109 under the control of the CPU 1101.

The AGP bus 1121 is a bus interface for a graphics accelerator card that has been proposed to speed up graphics processing. The AGP bus 1121 is a bus that directly access the MEM-P 1102 at high throughput to speed up a graphics accelerator card.

The short-range communication circuit 1120 includes a short-range communication antenna 1120a. The short-range communication circuit 1120 is a communication circuit that communicates in compliance with the near field radio communication (NFC) or the Bluetooth®.

The engine controller 1130 includes the scanner section 1131 and the printer section 1132. The operation panel 12 includes a panel display 12a and a hard keys 12b. The panel display 12a is, e.g., a touch panel that displays current settings or a selection screen that receives the user input. The hard keys 12b includes, e.g., a numeric keypad and a start key. The numeric keypad receives setting values of image forming parameters such as an image density parameter. The start key receives an instruction to start copying.

The controller 1110 controls the overall printer 11 and controls, for example, drawing, communication, and input from the operation panel 12. The scanner section 1131 reads the image formed on the conveyance medium such as a sheet and generates image data. The printer section 1132 includes a transfer device that transfers the image using a color material such as a toner image onto the conveyance medium such as the sheet, a fixing device that fixes the image, a heating device, a drying device, and performs image formation on the sheet. Further, the scanner section 1131 or the printer section 1132 executes image processing such as error diffusion and gamma conversion.

The network I/F 1150 is an interface that performs communication of data through the communication network. The short-range communication circuit 1120 and the network I/F 1150 are electrically connected to the ASIC 1106 via the PCI bus 1122.

Figure 4:
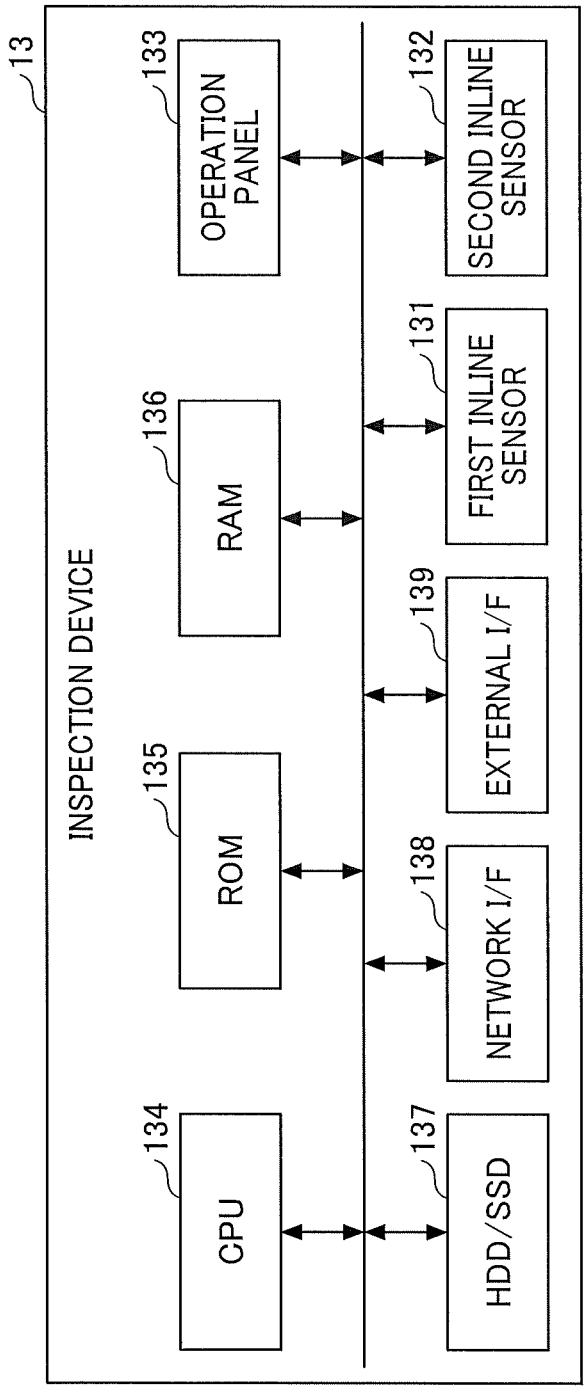
FIG. 4 is a diagram illustrating a hardware configuration of an inspection device of the image forming apparatus of FIG. 2.

FIG. 4 is a diagram illustrating a hardware configuration of an inspection device of the image forming apparatus of FIG. 2.

The inspection device 13 includes the first inline sensor 131, the second inline sensor 132, the operation panel 133, and a CPU 134, a ROM 135, a RAM 136, an HDD/solid state drive (SSD) 137, a network I/F 138, and an external I/F 139. The CPU 134, the ROM 135, the RAM 136, and the HDD/SSD are configured by a computer.

The CPU 134 reads programs stored in the ROM 135 or the HDD/SSD 137 and stores the programs in the RAM 136. Then, the CPU 134 executes various processes in accordance with the program stored in the RAM 136. The processes are described below.

The ROM 135 is a non-volatility auxiliary memory device. The ROM 135 stores programs such as a basic input/output system (BIOS) that is programed basic operations of the inspection device 13.

The RAM 136 is a volatile main memory device. The RAM 136 is used as a working area of the CPU 134.

The HDD/SSD 137 is a large capacity non-volatility auxiliary memory device. The HDD/SSD 137 stores received image data, programs for various processes, and setting information. The processes are described below.

The network I/F 138 is, for example, a local area network (LAN) card, and is a relay unit for communicating with other devices via a communication network.

The external I/F 139 is a relay unit for communicating with the devices connected as external devices, such as the DFE 50, the printer 11, and the stacker 14.

Note that the DFE 50 has the substantially same hardware configuration as the hardware configuration of the inspection device 13, except that the DFE 50 has the first inline sensor 131, the second inline sensor 132, and the operation panel 133.

Figure 5:
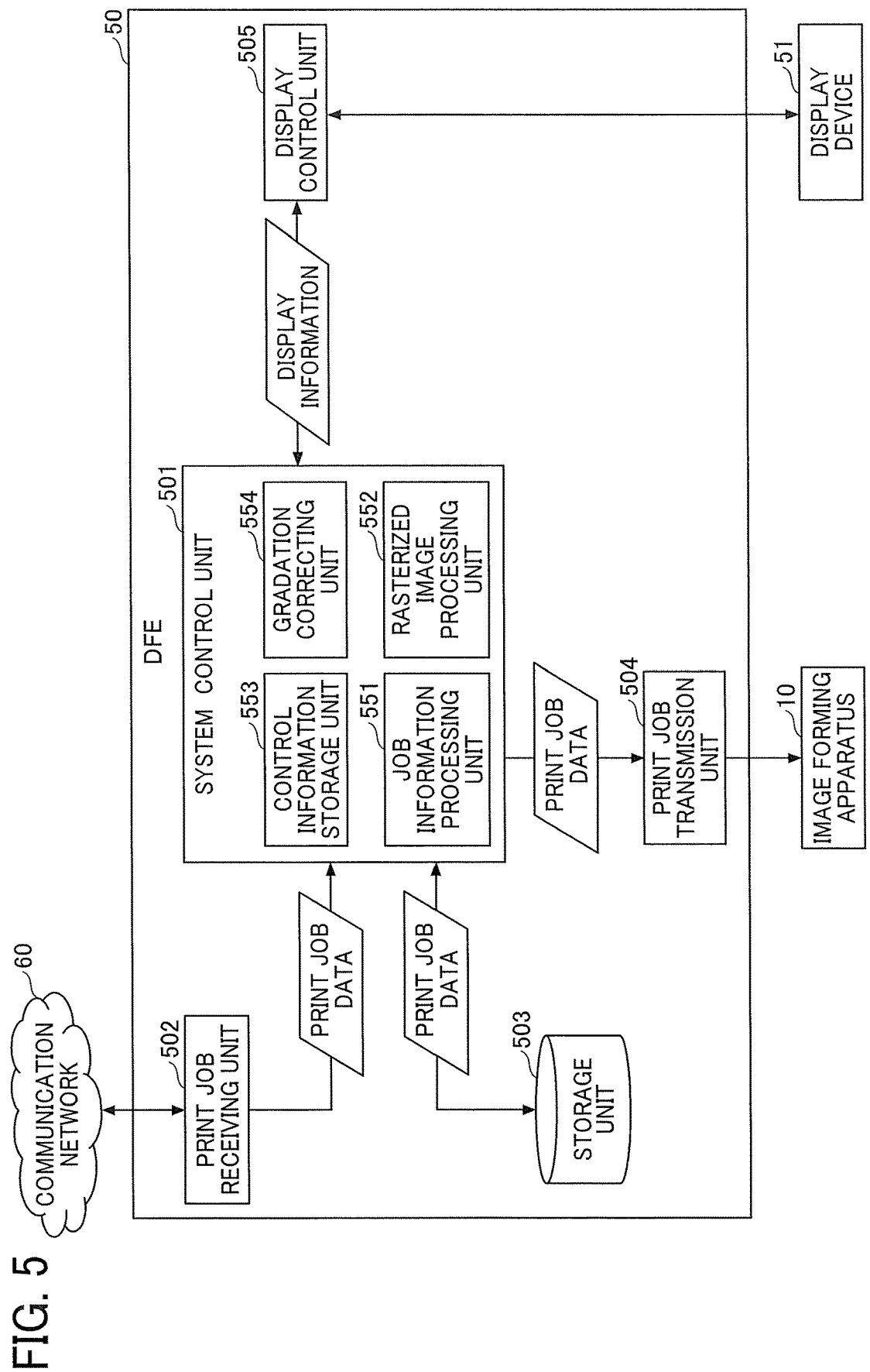
FIG. 5 is a diagram illustrating functions of a digital front end (DFE) of the image forming system of FIG. 1.

FIG. 5 is a diagram illustrating functions of the DFE of the image forming system of FIG. 1.

The DFE 50 includes a system control unit 501, a print job receiving unit 502, a storage unit 503, a print job transmission unit 504, and a display control unit 505. Each of the units of the DFE 50 is achieved by a CPU included in the DFE 50 executing processing defined in programs stored in a ROM included in the DFE 50.

The system control unit 501 includes a job information processing unit 551, a rasterized image processing unit 552, a control information storage unit 553, and a gradation correcting unit 554.

The job information processing unit 551 processes information about a job included in the print job data.

The rasterized image processing unit 552 performs predetermined color conversion processing on the CMYK values or the RGB values of the input image data using a RIP engine and converts the CMYK values or the RGB values into image data in a CMYK format suitable for the image forming apparatus 10.

The control information storage unit 553 stores control information controlled by the system control unit 501.

The gradation correcting unit 554 corrects a gradation of the image data converted by the rasterized image processing unit 552.

The print job receiving unit 502 receives the print job data from the user terminal 30 or the management server 40 via the communication network 60.

The storage unit 503 stores the received print job data.

The print job transmission unit 504 transmits the print job data to the image forming apparatus 10. The print job data is generated through processing by the system control unit 501. The print job data transmitted to the image forming apparatus 10 includes rasterized image data and job information indicating attributes of the print job.

The display control unit 505 controls to display display information generated by the system control unit 501 on the display device 51.

Figure 6:
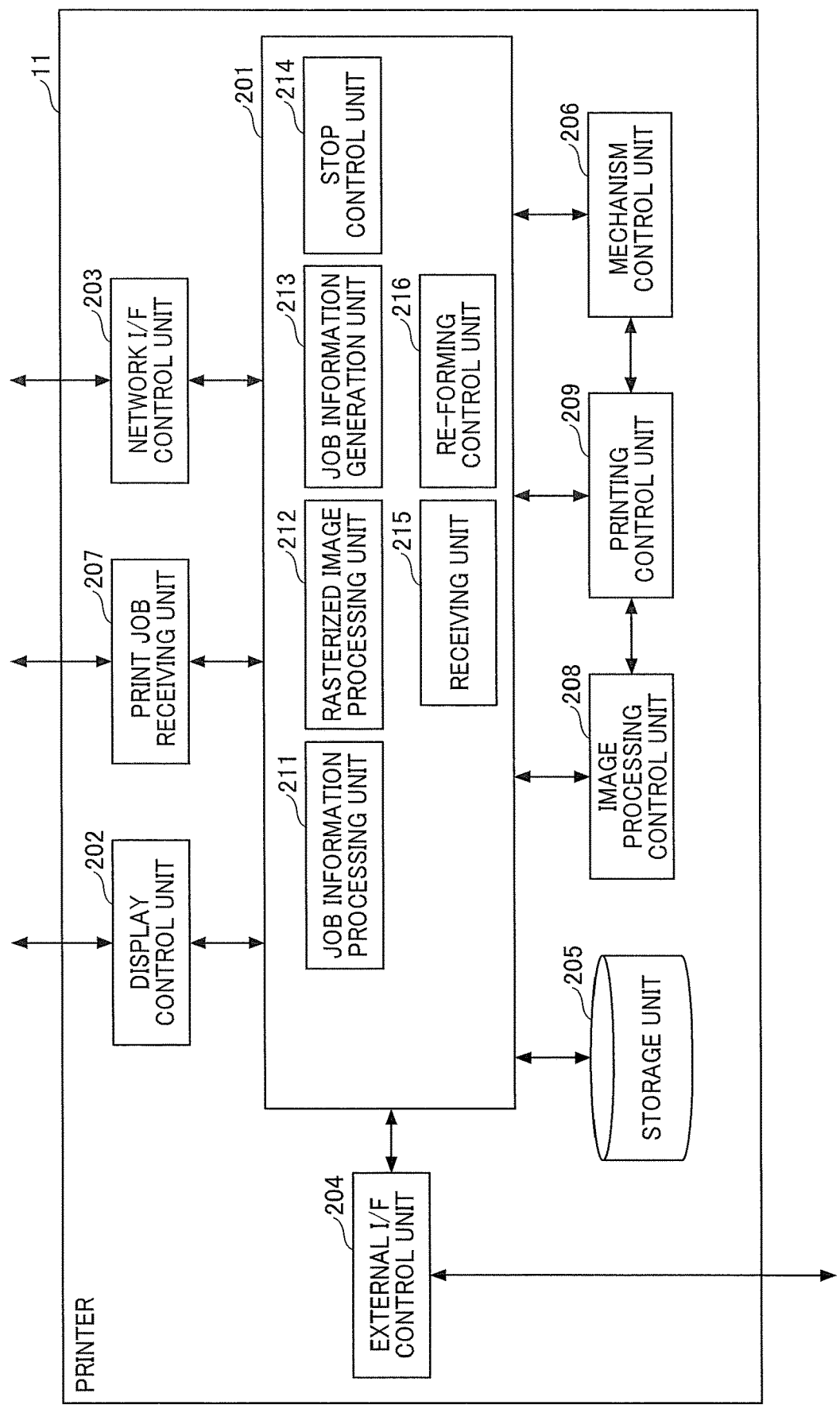
FIG. 6 is a diagram illustrating functions of the printer of the image forming apparatus of FIG. 2.

FIG. 6 is a diagram illustrating functions of the printer of the image forming apparatus of FIG. 2.

The printer 11 includes a system control unit 201, a display control unit 202, a network I/F control unit 203, an external I/F control unit 204, a storage unit 205, a mechanism control unit 206, a print job receiving unit 207, an image processing control unit 208, and a printing control unit 209. Each of these units of the printer 11 is achieved by the CPU 1101 or the ASIC 1106 of the printer 11 executing a process defined in programs stored in the MEM-P 1102 or the MEM-C 1107.

The system control unit 201 controls the overall operation of the printer 11. The system control unit 201 includes a job information processing unit 211, a rasterized image processing unit 212, a job information generation unit 213, stop control unit 214, a receiving unit 215, and a re-forming control unit 216.

The job information processing unit 211 processes job information included in the print job transmitted from the DFE 50. The job information processing unit 211 stops processing job information in response to receipt of instruction to stop the print job from the stop control unit 214.

The rasterized image processing unit 212 processes the rasterized image data included in the print job transmitted from the DFE 50.

When the job information generation unit 213 receives information indicating the request of the slip sheet (slip sheet request information) from the inspection device 13, the job information generation unit 213 generates job information for printing the slip sheet in a case where the slip sheet request information indicates the slip sheet is to be printed. In addition, when the job information generation unit 213 receives information (re-formation request information) indicating the request of re-formation of an image, from the inspection device 13, the job information generation unit 213 generates job information for re-forming the image in a case where the re-formation request information indicates the image is to be re-formed.

A format of an image to be printed on the slip sheet is determined in advance. Then, the storage unit 205 stores information indicating the format to print the slip sheet. The format may be determined for each type or size of the sheets. Further, the format may be stored in the storage unit 205 in advance or may be transmitted together with a first slip sheet request information by the inspection device 13.

Note that the slip sheet (insertion sheet) may be a sheet such as cut paper that is a conveyable medium by the printer 11. The conveyance medium may be a colored sheet, a blank sheet, or a blank sheet having a size different from the size of the sheet of the job, a film sheet, a plastic sheet, as long as the conveyance medium has identification information of the slip sheet (conveyance medium) and is stacked in a sheet feeding tray provided for the printer 11, to be conveyed and output according to an output instruction of the slip sheet. The slip sheet is referred to as a third conveyance medium while a printed sheet is referred to as a first conveyance medium as described above. The identification information of the slip sheet (third conveyance medium) is printed by an image forming unit of the printer 11. Alternatively, the identification information may be applied to or printed on the slip sheet in advance, or the size of the sheet or the ejection direction of the sheet may be used as the identification information of the slip sheet (third conveyance medium). The image forming unit of the printer 11 controls the printer section 1132 to form an image including the identification information of the third conveyance medium on the third conveyance medium. Accordingly, even when a plurality of defective printed sheets and a plurality of slip sheets corresponding to the defective printed sheets are ejected to an ejection device such as a sheet ejection tray, it is easy for a user to distinguish the slip sheets and confirm the defective printed sheets corresponding to each of the slip sheets.

When the information (defect determination result information) indicating the determination result of the defect received from the inspection device 13 indicates that there is a defect on the sheet, the stop control unit 214 controls to stop the image formation by instructing the job information processing unit 211 to stop the print job.

The receiving unit 215 receives, from a user, selection of a timing at which an image is to be re-formed. Specifically, the receiving unit 215 receives selection of a separation position from options such as "separation of job" and "separation of copy", each being set in advance as a timing of re-forming an image. Note that the timing of re-forming an image may be an ejection timing to the sheet ejection tray 141, in addition to an image formation timing at which the image forming unit forms an image similar to an image on the first conveyance medium with the defect, on the first conveyance medium. In a case where the ejection timing is selected, the image forming unit of the printer 11 may employ a configuration in which sheets are ejected to a tray temporarily after images are re-formed, then the sheets are ejected to the sheet ejection tray 141 at the selected ejection timing. The sheets may be collectively inserted between copies or jobs.

The re-forming control unit 216 causes the image forming unit of the printer 11 to re-form an image on a second conveyance medium at a selected timing. The image is determined to have a defect based on read image data acquired by reading an image formed on a first conveyance medium.

The display control unit 202 controls to display various types of information including job information on the operation panel 12. The network I/F control unit 203 controls the network I/F 1150 and controls connection with a communication network. When another device is connected to the printer 11, the external I/F control unit 204 controls connection with the connected device. The storage unit 205 stores various types of information including job information.

The mechanism control unit 206 controls operations of mechanisms included in the printer 11, such as operations of a mechanism that performs sheet conveyance and operations of a mechanism that performs transfer process in the printer 11 including the printer section 1132. The print job receiving unit 207 receives the print job from the DFE 50. The image processing control unit 208 processes the print image transferred by the mechanism control unit 206. The printing control unit 209 controls image formation on the conveyance medium. The conveyance medium includes a sheet on which no image has been formed, a sheet on which an image has been formed (first conveyance medium), a sheet on which an image has been re-formed (second conveyance medium), a slip sheet (third conveyance medium), and a separation sheet (fourth conveyance medium). Further, the information acquisition device such as the inline sensor may acquire information on an image based on the image after toner is fixed to the conveyance medium by the fixing roller 117 or based on the image before the conveyance medium enters the fixing roller 117 after the image is transferred by the transfer roller 112.

Figure 7:
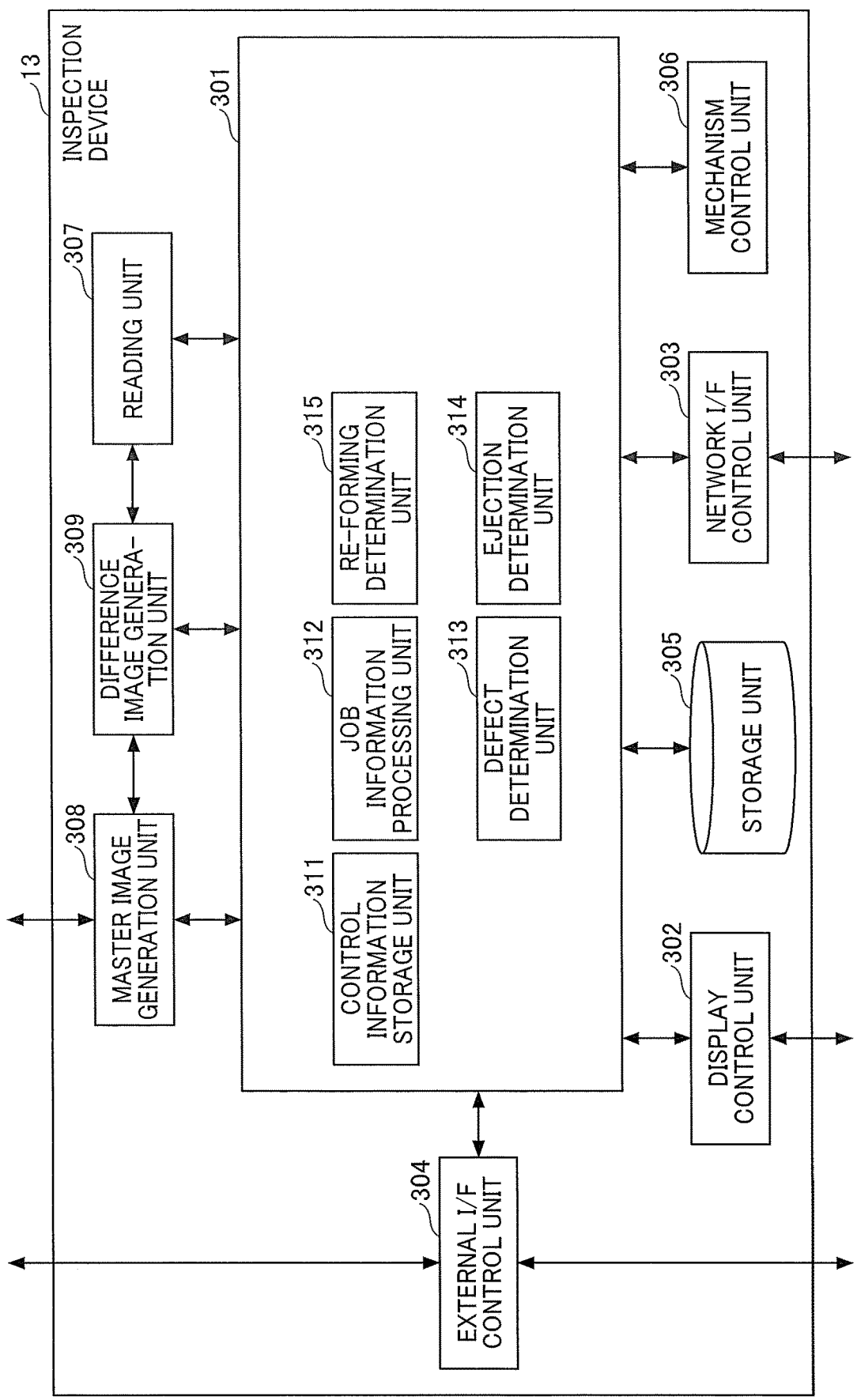
FIG. 7 is a diagram illustrating functions of the inspection device of the image forming apparatus of FIG. 2.

FIG. 7 is a diagram illustrating functions of the inspection device of the image forming apparatus of FIG. 2.

The inspection device 13 includes a system control unit 301, a display control unit 302, a network I/F control unit 303, an external I/F control unit 304, a storage unit 305, a mechanism control unit 306, a print image reading unit 307, a master image generation unit 308, and a difference image generation unit 309. Each of these units is achieved by the CPU 134 or the ASIC 1106 of the inspection device 13 executing processing defined in programs stored in the MEM-P 1102 or the MEM-C 1107 of the inspection device 13.

The system control unit 301 controls the overall operation of inspection device 13. The system control unit 301 includes a control information storage unit 311, a job information processing unit 312, a defect determination unit 313, an ejection determination unit 314, and a re-forming determination unit 315.

The control information storage unit 311 stores control information controlled by the system control unit 301. Further, the control information storage unit 311 temporarily stores received job information while the job information is an object to be controlled.

The job information processing unit 312 extracts information to be processed by a post-processing device (for example, a device that performs post-processing such as the stacker 14) from job information and transmits the extracted information to the post-processing device via the external I/F control unit 304. Further, the job information processing unit 312 transfers job information excluding information to be processed by the post-processing device, to the master image generation unit 308, the defect determination unit 313, the print image reading unit 307, and the mechanism control unit 306.

The display control unit 302 controls to display various types of information including an inspection result on the operation panel 133 or a different device.

The network I/F control unit 303 controls the network I/F 138. The external I/F control unit 304 controls the external I/F 139.

The storage unit 305 stores various types of information. Specifically, job execution history information related to the print job that the control has been ended, and a difference image data indicating the difference between the read image data and the master image data are stored.

The mechanism control unit 306 controls an operation of a mechanism included in the inspection device 13 such as conveyance of the sheet.

The print image reading unit 307 controls the first inline sensor 131 and the second inline sensor 132 to read the image formed on a sheet by the printer 11, and to generate read image data indicating the read image.

The master image generation unit 308 generates master image data based on the rasterized image data. Specifically, the master image generation unit 308 converts rasterized image data in the CMYK format into master image data in the RGB format.

Note that the master image data is data serving as a reference for comparison with the read image data and is used as the correct data when printed correctly. The master image data may be created by reading the sheet on which a reference image is printed with the scanner section 1131, the inline sensor, or a scanner of an external device.

The difference image generation unit 309 generates difference image data indicating a difference between the master image data and the read image data.

The defect determination unit 313 determines whether the printed image has a defect by comparing the difference image data with a predetermined threshold. The threshold is information (value) serving as a criterion for determining that the image has the defect. The defect determination unit 313 refers to the threshold and determines that the image has the defect if the difference image data has an area exceeding the threshold. The threshold is, for example, a value indicating that a difference (comparison result) between density values of each pixel included in the difference image data is equal to or greater than a predetermined density value, or a value indicating an area of a portion where pixels having a difference equal to or greater than the predetermined density value are continuous. The setting of the threshold is changed by the user so that the threshold is increased (the criterion is relaxed) or decreased (the criterion is tightened). A defect refers to a portion of image data determined to be different from an image desired by the user (for example, master image data) when a determination result determined by the defect determination unit 313 exceeds a threshold. The defect includes, for example, a spot, a streak, a positional deviation of the image, a difference in color, and a void in color.

Note that the defect determination method may be a determination method of determining whether the value of a printed image exceeds a set threshold (difference from ideal image data) based on a read image data obtained by reading ideal image data in advance of printing, other than the above-described method of comparing master image data and read image data. Further, before defect determination process is performed, correction processing may be performed to increase the accuracy of the determination processing. The correction processing is processing such as skew correction of read image data for correcting read image data of a medium conveyed in a skewed manner to a correct orientation or position, or flare correction for correcting a white light portion in read image data at the time of reading.

When the defect determination unit 313 determines that the image has a defect, the ejection determination unit 314 determines whether the slip sheet (third conveyance medium) is ejected. Ejection of the slip sheet indicates that the image has the defect. The slip sheet is a sheet to be inserted between printed sheets stacked as a bundle of printed sheets on the stacker 14. A criterion for determining whether to eject a slip sheet (third conveyance medium) is set in advance. When a defect is detected, the ejection determination unit 314 may determine that the slip sheet (third conveyance medium) is constantly ejected, that is, the slip sheet (third conveyance medium) is unconditionally ejected.

When the defect determination unit 313 determines that the image has a defect, the re-forming determination unit 315 determines whether to re-form the image that is determined to have a defect. A criterion for determining whether to re-form the image is set in advance. When a defect is detected, the re-forming determination unit 315 may determine to constantly re-form the image, that is, the image is unconditionally re-formed.

Descriptions are given of information that the image forming system 1 controls.

FIG. 8 is a diagram illustrating items of job information, according to embodiments of the present disclosure.

Job information 901 is information included in print job data generated by the DFE 50 or the printer 11. The job information 901 includes items "JOB GENERATION SOURCE", "GENERATION TIME", "PAGE ID", "PRINT FACE", "SHEET ID", "COPY ID", "JOB ID", "SHEET TYPE", "SHEET SIZE", "JOB TYPE", and "SLIP SHEET ID".

The value of the item "JOB GENERATION SOURCE" is a value indicating the generation source of the print job data and is either a "DFE JOB" or an "INTERNAL JOB". When the job information is included in the print job data to be transmitted to the image forming apparatus 10 by the DFE 50, the value of the item "JOB GENERATION SOURCE" is the "DFE JOB". When the job information generation unit 213 of the printer 11 generates the print job data for the slip sheet or the print job for the re-formation image, since the print job data is generated inside the image forming apparatus 10, the value of the item "JOB GENERATION SOURCE" is the "INTERNAL JOB".

The value of the item "GENERATION TIME" is a value indicating the time at which the generation source generated the job information.

The value of the item "PAGE ID" is a numerical value to identify the print image and is incremented by one for output of each page starting from activation of the power source. The numerical value is set in the item "PAGE ID" when printing is executed.

The value of the item "PRINT FACE" is a value to identify whether the print image is to be printed on one side in single-sided printing, on the front face in duplex printing (front in duplex), or on the back face in duplex printing (back in duplex).

The value of the item "SHEET ID" is a numerical value to identify a sheet. When the duplex printing is performed, two page IDs are given to the same sheet ID. The value of the item "SHEET ID" is incremented by one for process of each page starting from activation of the power source. A numerical value is set in the item "SHEET ID" when printing is executed.

The value of the item "COPY ID" is a numerical value to identify a unit of copy and is incremented by one for output of each copy starting from activation of the power source. A numerical value is set in the item "COPY ID" when printing is executed.

The value of the item "JOB ID" is a numerical value to identify the print job unit and is incremented by one for output of each job starting from activation of the power source. A numerical value is set in the item "JOB ID" when printing is executed.

The value of the item "SHEET TYPE" is a value indicating the type of the sheet. The value of the item "SHEET SIZE" is a value indicating the size of the sheet. Note that a sheet to be printed and used as a slip sheet is selectable, depending on the settings, between a sheet used in the print job in which the defect was detected, or a sheet stacked on a designated sheet feeding tray. By using a sheet used in the print job for printing an image on the slip sheet, time-consuming process such as readjustment of the fixing temperature does not need to be performed, and the processing time is shortened. Further, when a sheet to be printed and used as a slip sheet is a sheet stacked on the designated sheet feeding tray, an inexpensive sheet is used to be dedicated to the slip sheet, and the cost is reduced.

The value of the item "JOB TYPE" is a value indicating whether the job is an object of defect detection, a non-object of defect detection, a slip sheet for defect detection identification, or a re-formation of the image. When the job information generation unit 213 of the printer 11 generates the print job data for slip sheets, the value of the item "JOB TYPE" is a value indicating a slip sheet for defect detection identification. When the value of the item "JOB TYPE" is a value indicating a non-target of defect detection or a slip sheet for defect detection identification, the defect determination unit 313 does not execute processing.

The value of the item "SLIP SHEET ID" is an identifier to identify the slip sheet. The value of the item "SLIP SHEET ID" is notified from the inspection device 13 to the printer 11. In a case of a job generated by the DFE 50 or a job generated by the printer 11 for other than a slip sheet, a slip sheet ID does not exist. For this reason, the value "−1" is set in the item "SLIP SHEET ID" as a value indicating that a slip sheet ID does not exist.

Next, descriptions are given of operations of the image forming system 1. The display control unit 202 of the printer 11 displays an image re-forming setting screen so that the receiving unit 215 receives selection of timing for re-forming an image.

Figure 9:
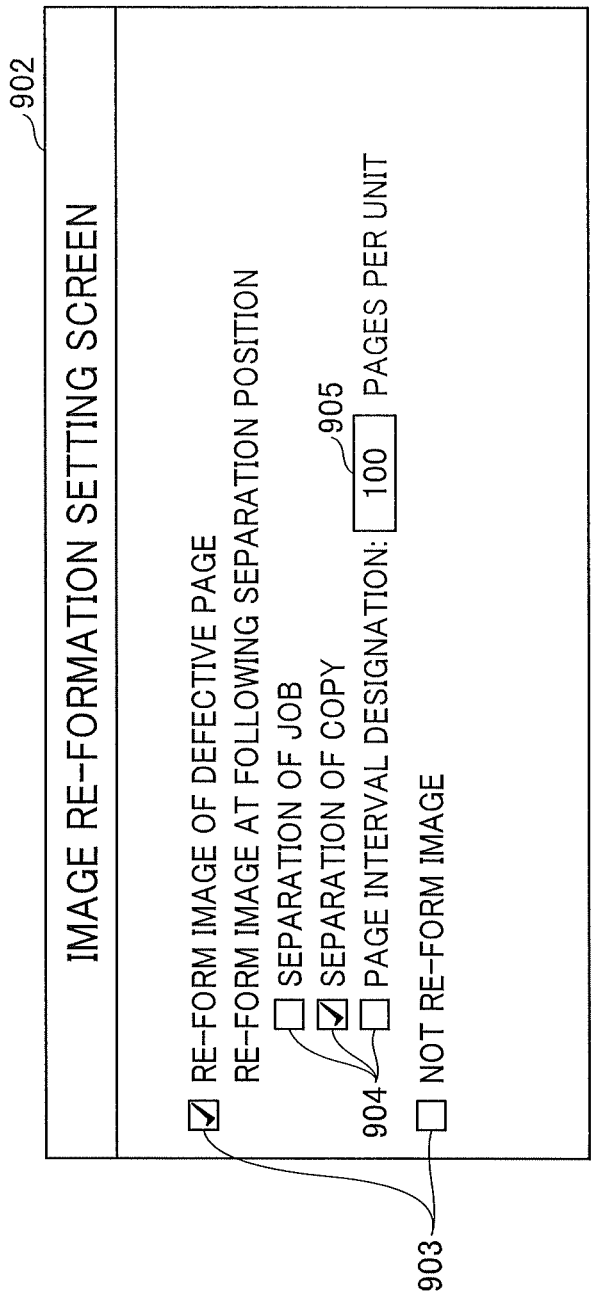
FIG. 9 is a diagram illustrating an image re-formation setting screen, according to a first embodiment of the present disclosure.

FIG. 9 is a diagram illustrating an image re-formation setting screen, according to a first embodiment of the present disclosure.

An image re-formation setting screen 902 according to the present embodiment includes an image re-formation selection button 903, a separation position selection button 904, and a page count input field 905.

The image re-formation selection button 903 is a graphical user interface (GUI) to select whether to re-form an image that a defect has been detected. The separation position selection button 904 is a GUI to select a separation position.

Note that the separation position is a position that the image is re-formed. Specifically, the separation position is a position where image formation is temporarily stopped to allow the printer 11 to match the timing to re-form the image. In other words, the printer 11 is configured to re-form the image at the separation position.

Note that "separation of job", "separation of copy", and "page interval designation" are examples of the option of separation position. The option of separation position may be selected other than these options. For example, in a case where a plurality of print jobs is received, a position may be selected, at which images are collectively re-formed after all processes of the received print jobs are completed.

The page count input field 905 is an input field to input the number of pages when the separation position is selected as "page interval designation".

The receiving unit 215 receives a selection input on the image re-formation setting screen 902 and stores setting information indicating the selected setting in the storage unit 205. The display control unit 202 may display the image re-formation setting screen 902 on the operation panel 12 of the printer 11 or on the display device 51 of the DFE 50. Alternatively, the display control unit 202 may display the image re-formation setting screen 902 on the screen of the user terminal 30 via the communication network 60.

Figure 10:
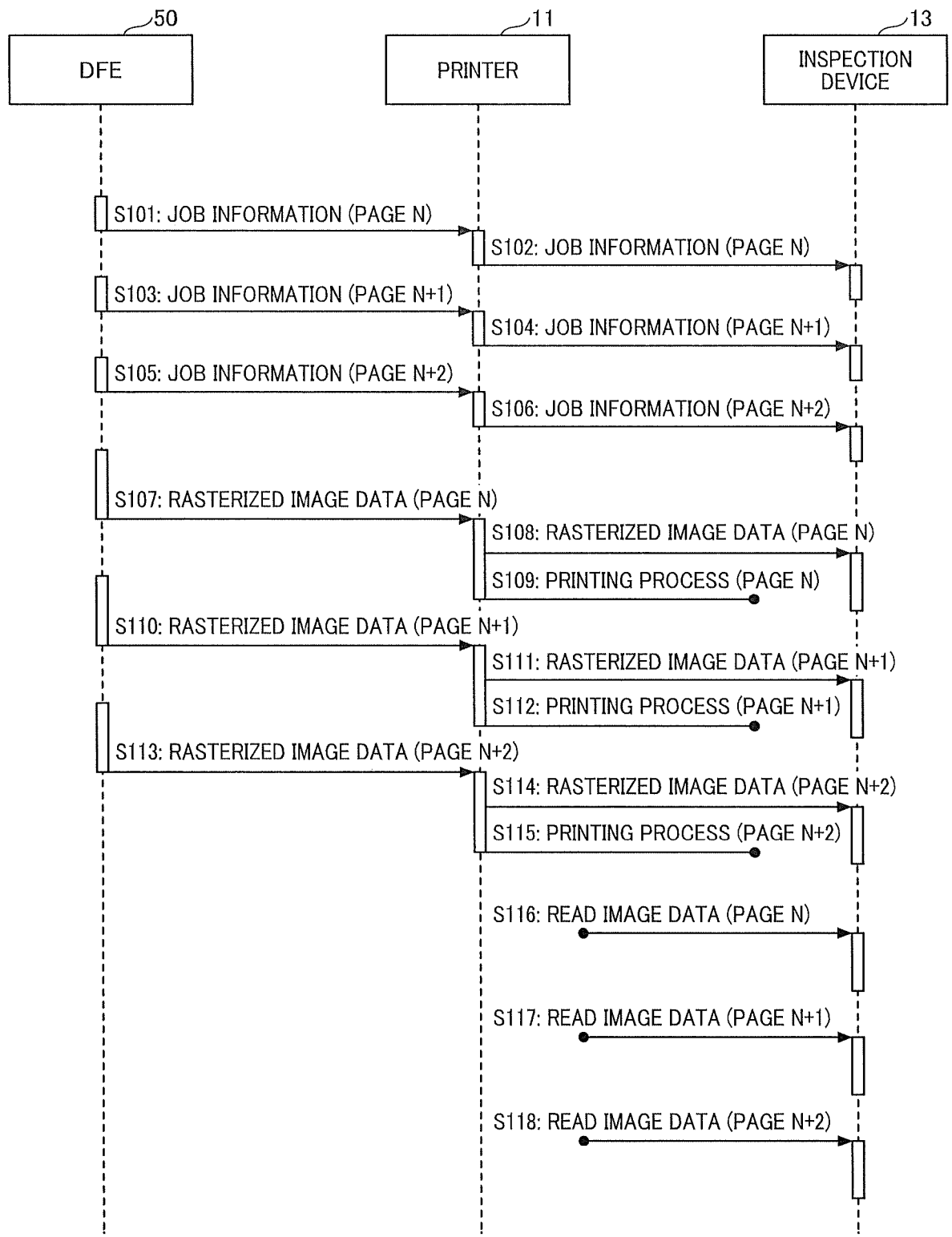
FIG. 10 is a sequence diagram illustrating an example of a print process without re-forming an image.

FIG. 10 is a sequence diagram illustrating an example of a print process without re-forming the image.

When the print job receiving unit 502 of the DFE 50 receives print job data from the user terminal 30 or the management server 40, the job information processing unit 551 generates job information (bibliographic information about the print job) for each page of the print job. Then, in step S101, the print job transmission unit 504 of the DFE 50 transmits job information (for example, page n) to the printer 11.

In step S102, when the print job receiving unit 207 of the printer 11 receives the job information (page n), the job information processing unit 211 of the printer 11 performs processing such as addition of the numerical value indicating the page ID to update the received job information (page n) and transmits the updated job information to the inspection device 13 via the external I/F control unit 204.

When the print job receiving unit 502 of the DFE 50 receives the print job from the user terminal 30 or the management server 40, the rasterized image processing unit 552 of the DFE 50 performs processing of converting each page into the rasterized image data. The job information processing unit 551 and the rasterized image processing unit 552 of the DFE 50 perform processing in parallel, and the job information that completes processing first is transmitted to the printer 11 first. For example, the DFE 50 generates and transmits job information for page n+1 and page n+2 before starting transmission of the rasterized image data (page n). Then, in steps S103 to S106, the printer 11 updates the received job information and transmits the updated job information to the inspection device 13.

Then, the rasterized image processing unit 552 of the DFE 50 generates rasterized image data (page n) corresponding to the job information (page n). In step S107, the print job transmission unit 504 transmits the rasterized image (page n) to the printer 11. In step S108, the rasterized image processing unit 212 of the printer 11 performs processing for the rasterized image data and transmits the processed rasterized image data to the inspection device 13.

The master image generation unit 308 of the inspection device 13 generates master image data (page n) according to the job information (page n) and the rasterized image data (page n). Then, in accordance with the job information, the inspection device 13 associates the order of pages detected by the first inline sensor 131 and the second inline sensor 132 with the generated master image data and stores the association result in the storage unit 305.

In step S109, the image processing control unit 208, the printing control unit 209, and the mechanism control unit 206 of the printer 11 execute the print process accordance with the job information (page n). The printed sheet (page n) is conveyed to the inspection device 13.

In steps S110 to S115, the DFE 50 and the printer 11 perform processing on the rasterized image (pages n+1 and n+2) in the same way. Then, in steps S116 to S118, the print image reading unit 307 of the inspection device 13 acquires read image data (pages n, n+1, n+2) read by the first inline sensor 131 and the second inline sensor 132.

Subsequently, the difference image generation unit 309 of the inspection device 13 generates difference image data indicating a difference between the master image data and the read image data for each page. The defect determination unit 313 determines whether the image includes any defect based on the generated difference image data and generates defect determination information. Then, inspection device 13 executes the defect determination process. The defect determination process is described below.

Figure 11:
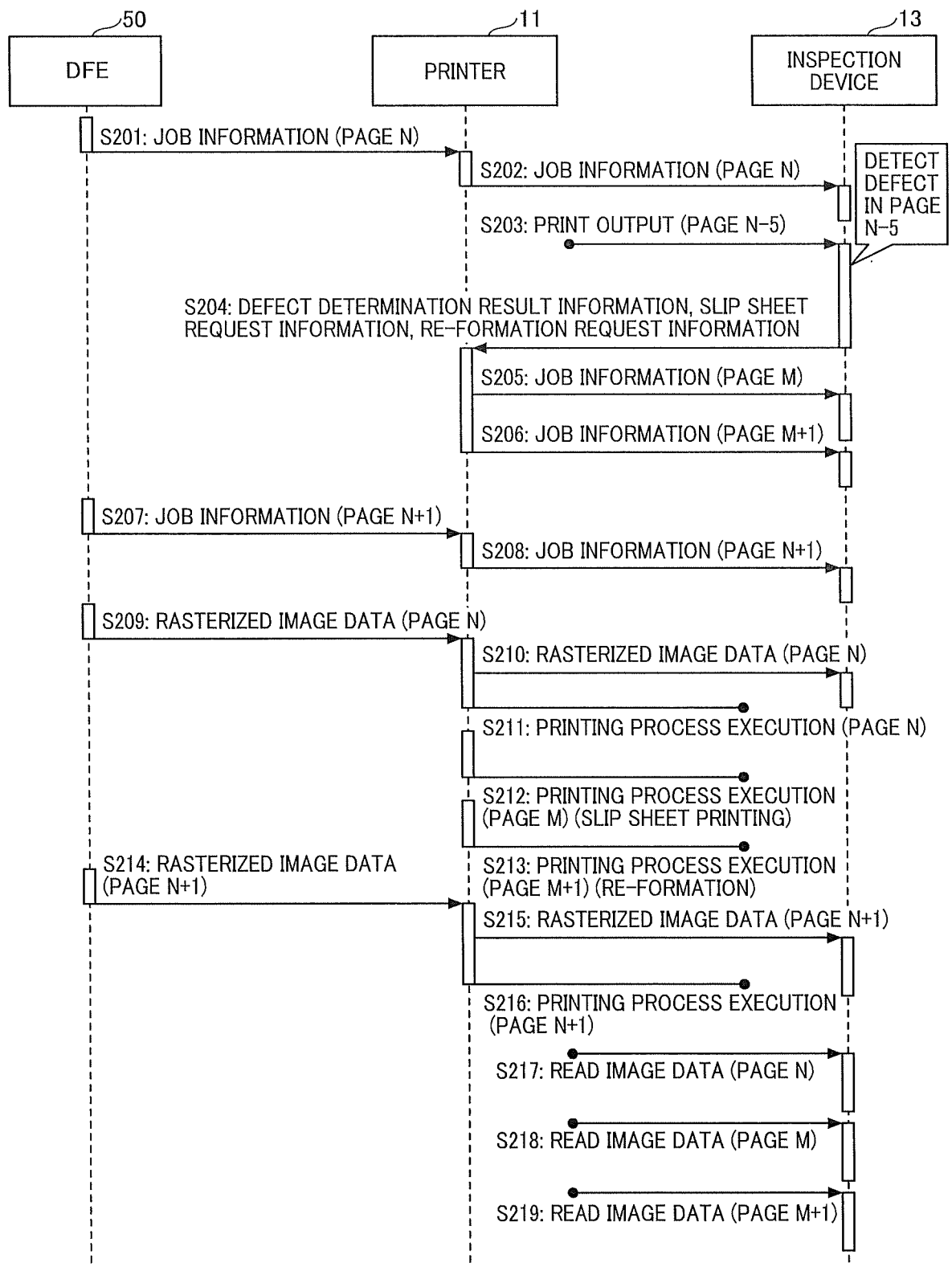
FIG. 11 is a sequence diagram illustrating an example of the print process with re-forming the image.

FIG. 11 is a sequence diagram illustrating an example of the print process with re-forming the image.

In the print process with the image re-formation illustrated in FIG. 11, step S201 and step S202 are the same as step S101 and step S102, respectively, of the print process without image re-formation illustrated in FIG. 10.

In the case of the print process with the image re-formation, for example, in step S203, the defect determination unit 313 determines that the image includes a defect in the page n−5 on which print output has already been performed, and the re-forming determination unit 315 determines that the image is to be re-formed by the defect determination process described below. In step S204, the inspection device 13 transmits the defect determination result information, the slip sheet request information, and the re-formation request information, to the printer 11.

When the received slip sheet request information indicates that the slip sheet is to be printed, the job information generation unit 213 of the printer 11 determines the timing of inserting the slip sheet and generates job information (page m). For example, the timing of inserting the slip sheet may be a timing at which the slip sheet is inserted between the page n and the page n+1. Then, in step S205, the printer 11 transmits the generated job information (page m) to the inspection device 13.

Subsequently, when the received re-formation request information indicates a request of re-formation of an image, the printer 11 generates job information (page m+1). Then, in step S206, the printer 11 transmits the generated job information (page m+1) to the inspection device 13.

Step S207 and step S208 illustrated in FIG. 11 are the same as step S103 and step S104, respectively, of the print process without image re-formation illustrated in FIG. 10.

Further, steps S209 to S211 illustrated in FIG. 11 are the same as steps S107 to S109, respectively, of the print process without image re-formation as illustrated in FIG. 10.

In step S212, at the timing of inserting a slip sheet (for example, between page n and page n+1), the image processing control unit 208, the printing control unit 209, and the mechanism control unit 206 of the printer 11 execute the print process (printing of a slip sheet) according to the job information (page m). Subsequently, in step S213, the image processing control unit 208, the printing control unit 209, and the mechanism control unit 206 of the printer 11 re-form an image according to the job information (page m+1).

Steps S214 to S216 and step S217 illustrated in FIG. 11 are the same as steps S110 to S112 and step S116, respectively, of the print process without image re-formation illustrated in FIG. 10.

In step S218 and step S219, the print image reading unit 307 of the inspection device 13 acquires the read image data (page m and page m+1) read by the first inline sensor 131 and the second inline sensor 132. In the case of the print job for slip sheet, the master image generation unit 308 of the inspection device 13 does not generate the master image data. The inspection device 13 associates the order of pages detected by the first inline sensor 131 and the second inline sensor 132 with the generated master image data according to the job information of each page including the page m and the page m+1, and stores the associated information in the storage unit 305.

When the read image data is based on a slip sheet job (page in), the inspection device 13 discards the read image data without performing the defect determination process.

Figure 12:
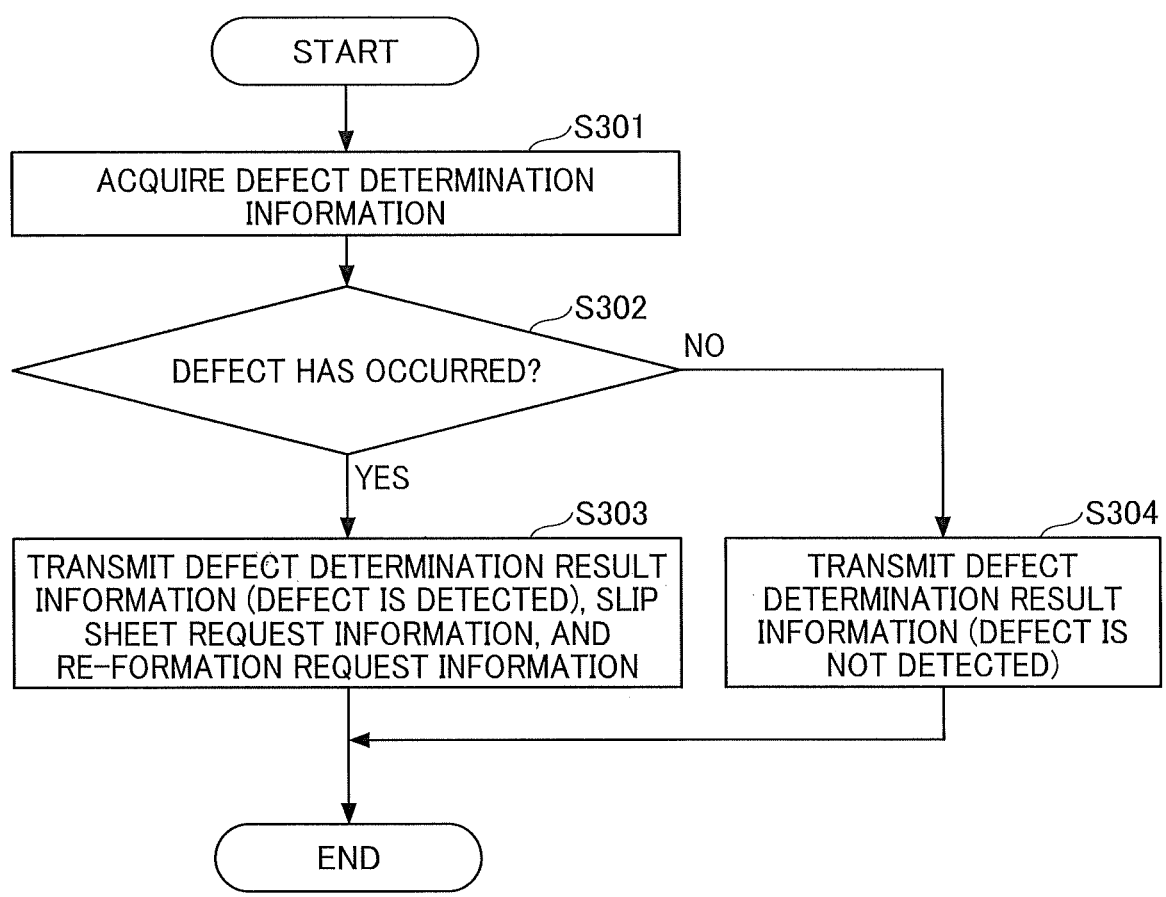
FIG. 12 is a flowchart of a defect determination process, according to the first embodiment of the present disclosure.

FIG. 12 is a flowchart of the defect determination process according to the first embodiment of the present disclosure.

When the defect determination process starts, the re-forming determination unit 315 acquires the defect determination information, in step S301. The defect determination information is generated by the defect determination unit 313 and includes a defect determination result for each printed page.

In step S302, the re-forming determination unit 315 determines whether the image includes any defect with reference to the defect determination result included in the defect determination information. When the re-forming determination unit 315 determines that the image includes a defect (YES in step S302), the ejection determination unit 314 determines whether to eject a slip sheet based on a condition set in advance, then generates slip sheet request information indicating the determination result. Further, the re-forming determination unit 315 determines whether to re-form the image based on a condition set in advance, then generates re-formation request information indicating the determination result. Then, in step S303, the inspection device 13 transmits defect determination result information indicating that the image includes a defect, slip sheet request information, and re-formation request information, to the printer 11.

When the re-forming determination unit 315 determines that the image does not include a defect (NO in step S302), the inspection device 13 transmits defect determination result information indicating that image does not include a defect to the printer 11, in step S304.

Next, an image formation process executed by the printer 11 is described.

Figure 13:
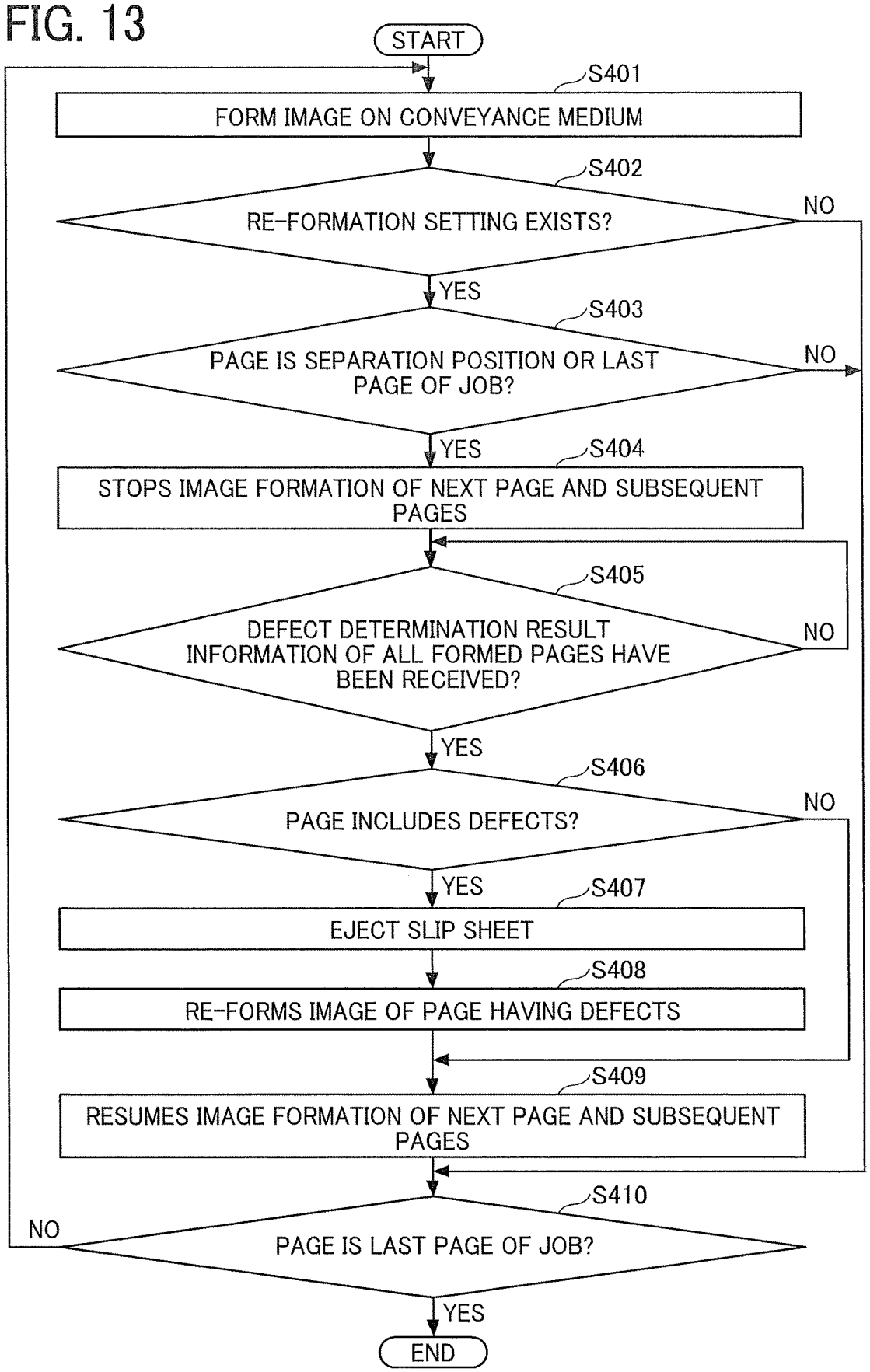
FIG. 13 is a flowchart of an image formation process, according to the first embodiment of the present disclosure.

FIG. 13 is a flowchart of the image formation process, according to the first embodiment of the present disclosure.

When the job information processing unit 211 of the printer 11 processes the job information received from the DFE 50, the image processing control unit 208, the printing control unit 209, and the mechanism control unit 206 form an image on the conveyance medium, in step S401. The printer 11 executes the following processing for each page included in the print job.

In step S402, the stop control unit 214 determines whether the image re-formation is set based on the setting information indicating an image re-formation setting.

When the stop control unit 214 determines that the image re-formation is not set (NO in step S402), the printer 11 skips the processing from step S403 to step S409 and executes the processing of step S410.

When the stop control unit 214 determines that the image re-formation is set (YES in step S402), the stop control unit 214 determines whether the page includes the separation position or the last page of the print job in step S403. The separation position is a position corresponding to the selection of the separation position selection button 904 on the image re-formation setting screen 902.

For example, when "separation of job" is selected, since "separation of job" indicates that the last page of the print job is a separation position, the stop control unit 214 determines whether the page is the last page of the print job and does not determine whether the page includes the separation position. When "separation of copy" is selected and the print job includes a plurality of copies, the stop control unit 214 determines whether the page is the last page of each copy or the last page of the print job. When "page interval designation" is selected, the stop control unit 214 determines whether the page count is a multiple of the page count designated in the page count input field 905 in the print job being printed or the last page of the print job.

When the stop control unit 214 determines that the page is not the separation position and is not the last page of the print job (NO in step S403), the printer 11 skips the processing from step S404 to step S409 and executes the processing of step S410.

When the stop control unit 214 determines that the page is the separation position or the last page of the print job (YES in step S403), the stop control unit 214 stops image formation of the next page and subsequent pages in step S404. Specifically, the stop control unit 214 instructs the job information processing unit 211 to stop processing of job information of the next page and subsequent pages.

Subsequently, the stop control unit 214 determines whether the defect determination result information for the whole formed pages has been received in step S405. Note that the whole formed pages are pages that are not object to be processed in and after step S406 described below. In other words, the whole formed pages are the whole pages included in each page group separated by the separation position.

When the stop control unit 214 determines that the defect determination result information of the whole formed pages has not been received (NO in step S405), the stop control unit 214 repeatedly executes the processing of step S405 until the defect determination result information of the whole formed pages is received.

When the stop control unit 214 determines that the defect determination result information of the whole formed pages has been received (YES in step S405), in step S406, the stop control unit 214 determines whether a page having a defect is included in the defect determination result information.

When the stop control unit 214 determines that the page having a defect is included in the defect determination result information (YES in step S406), the printer 11 ejects a slip sheet when the slip sheet request information received from the inspection device 13 indicates the slip sheet is to be printed in step S407. Specifically, the job information generation unit 213 generates job information for printing the slip sheet. Then, the job information processing unit 211 processes the generated job information. As a result, the printer 11 prints and ejects the slip sheet.

Subsequently, when the re-forming request information indicates that the image re-formation is to be executed, the printer 11 re-forms an image of the page having the defect in step S408. Specifically, the job information generation unit 213 generates the job information to re-form an image. Then, the job information processing unit 211 processes the generated job information. As a result, the printer 11 re-forms the image determined to have a defect.

Subsequently, the stop control unit 214 resumes image formation of the next page and subsequent pages in step S409. Specifically, the stop control unit 214 instructs the job information processing unit 211 to cancel the stop of the processing of the job information of the next page and subsequent pages.

When the stop control unit 214 determines that the defect determination result information does not include a defective page (NO in step S406), the stop control unit 214 skips the processing of step S407 and step S408 and resumes the image formation of the next page and subsequent pages in step S409.

Following the processing of step S409, the stop control unit 214 determines whether the page is the last page of the print job in step S410. When the stop control unit 214 determines that the page is not the last page of the print job (NO in step S410), the stop control unit 214 returns to the processing of step S401 and proceeds to the process to be performed on the next page.

When the stop control unit 214 determines that the page is the last page of the print job (YES in step S410), the stop control unit 214 ends the image forming process.

FIG. 14 is a diagram illustrating an example of the slip sheet.

A slip sheet ID is printed on the slip sheet 906, for example, at upper and lower positions. The printer 11 is configured to form information of a page including the image determined to be a defective image. The information is printed on the slip sheet 906. The information of the page in which the defect is detected includes, for example, the total number of pages in which the defect is detected, the job ID, the copy ID, the page ID, or the defect detection page location of each defect detection page. As a result, a user visually checks whether a slip sheet has been ejected to the separation position. In a case where the slip sheet has been ejected, the user finds the position at which a page having a detected defect is stacked, based on the printed information on the slip sheet.

Figure 15:
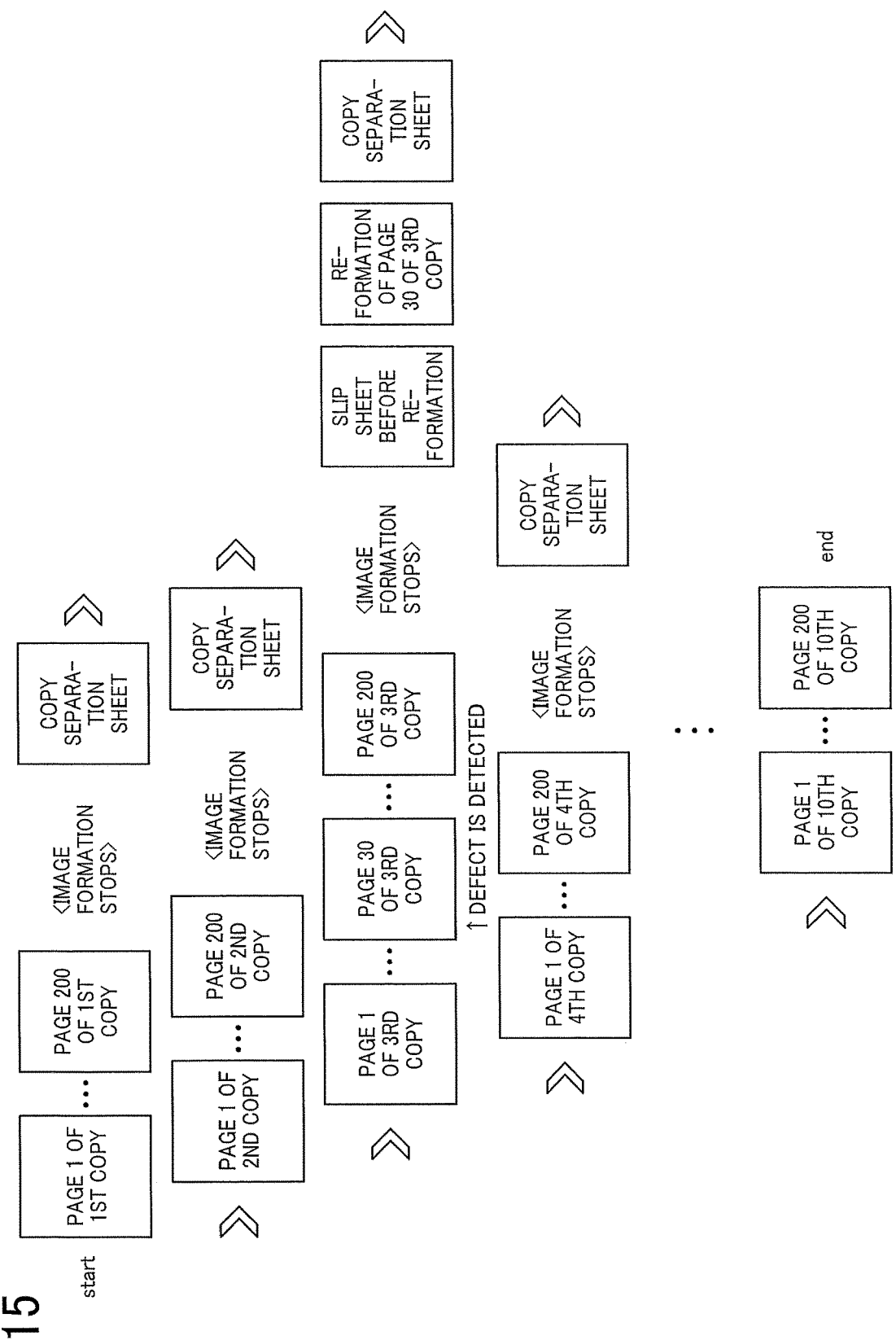
FIG. 15 is a diagram illustrating a result of an image re-formation, according to the first embodiment of the present disclosure.

FIG. 15 is a diagram illustrating a result of the image re-formation, according to the first embodiment of the present disclosure.

FIG. 15 illustrates the sequence of image re-formation when a defect is detected on the 30th page of the 3rd copy of a print job for printing 10 copies of an image of 200 pages and "print process with image re-formation" of the image re-formation selection button 903 and "separation of copy" of the separation position selection button 904 are selected on the image re-formation setting screen 902.

The printer 11 temporarily stops the formation of an image at the end of each copy. Then, the printer 11 prints the 200th page, which is the last page of the 3rd copy. When the formation of the image is stopped, the printer 11 prints and ejects the slip sheet, and then re-forms the image of the 30th page of the 3rd copy in response to detection of the defect in the image of the 30th page of the 3rd copy. In a case of a setting in which a separation sheet is ejected at a separation of copies, a separation sheet of the 3rd copy may be ejected after the re-formed page is ejected.

A user visually checks whether the slip sheet has been ejected at the separation position. When the slip sheet has been ejected, the user visually checks the image re-formed on the conveyance medium ejected following the slip sheet and replaces the page in which the defect has been detected as appropriate. Note that the printer 11 optionally replaces the defect detected page with the re-formed page. As a result, the user may or may not replace the defect detected page with the re-formed page, as appropriate.

Further, the inspection device 13 displays a defect display screen to display information on the detected defect.

Figure 16:
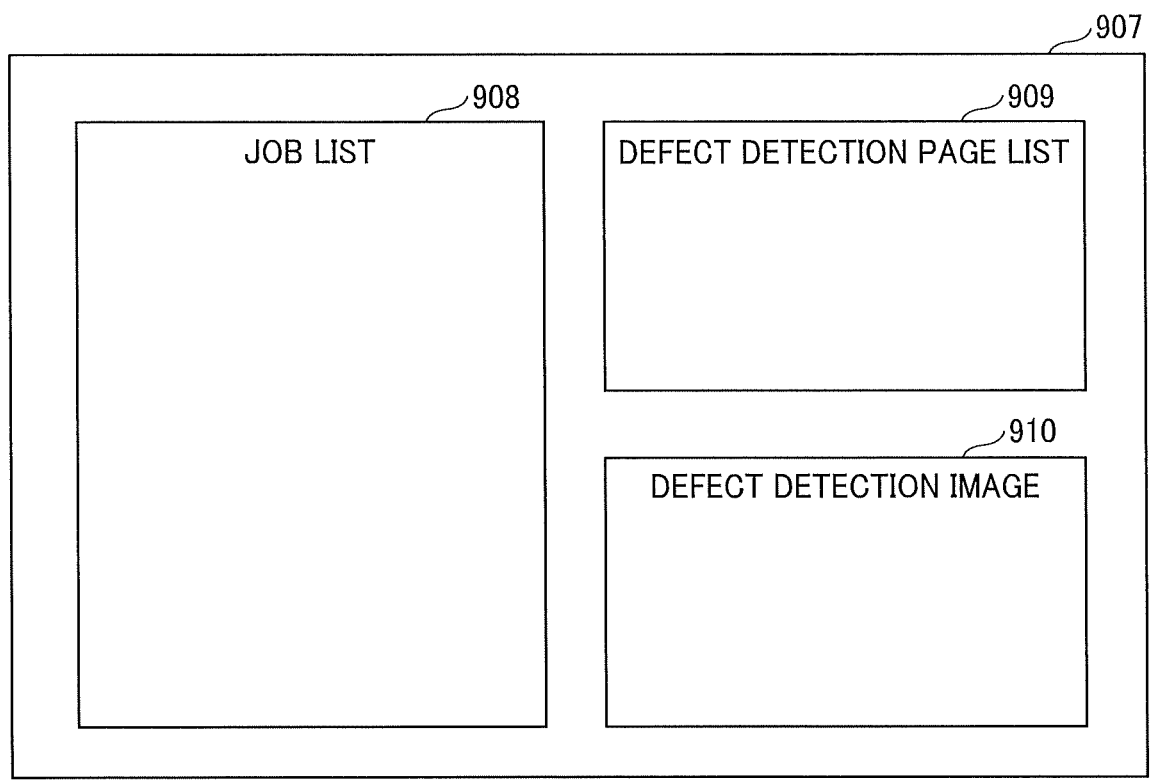
FIG. 16 is a diagram illustrating an example of a defect display screen.

FIG. 16 is a diagram illustrating an example of the defect display screen.

A defect display screen 907 is a screen displayed on the operation panel 133 of the inspection device 13 in order to display the detected defects. The defect display screen 907 includes a "JOB LIST" display area 908, a "DEFECT DETECTION PAGE LIST" display area 909, and a "DEFECT DETECTION IMAGE" display area 910.

FIG. 17 is a diagram illustrating an example of a job list.

The job list displayed in the "JOB LIST" display area 908 includes items "INSPECTION PROCESSING START TIME", "NUMBER OF COPIES OF JOB", "NUMBER OF PAGES OF JOB", and "NUMBER OF DEFECT-DETECTED PAGES OF JOB". The job list may include identification information to identify the job, such as job names or job IDs, with which a plurality of jobs is confirmed and identified.

The value of the item "INSPECTION PROCESSING START TIME" is a value indicating the start time of the inspection processing of the first page of the print job.

The value of the item "NUMBER OF COPIES OF JOB" is a value indicating the number of copies output in the print job.

The value of the item "NUMBER OF PAGES OF JOB" is a value indicating the number of pages included in the print job.

The value of the item "NUMBER OF DEFECT-DETECTED PAGES OF JOB" is a value indicating the number of pages with defects detected in the print job.

FIG. 18 is a diagram illustrating an example of a defect detection page list.

The defect detection page list displayed in the "DEFECT DETECTION PAGE LIST" display area 909 includes items "DEFECT DETECTION TIME", "NUMBER OF DEFECTIVE COPIES OCCURRED IN JOB", "NUMBER OF DEFECTIVE PAGES OCCURRED IN JOB", "SLIP SHEET ID IMMEDIATELY BEFORE RE-FORMED PAGE", and "RELATION OF POSITIONS OF DEFECT DETECTED PAGE AND SLIP SHEET".

The value of the item "DEFECT DETECTION TIME" is a value indicating the time at which the defect was detected for each page.

The value of the item "NUMBER OF DEFECTIVE COPIES OCCURRED IN JOB" is a value indicating the number of copies where the defect has occurred.

The value of the item "NUMBER OF DEFECTIVE PAGES OCCURRED IN JOB" is a value indicating the number of pages where the defect has occurred.

The value of the item "SLIP SHEET ID IMMEDIATELY BEFORE RE-FORMED PAGE" is a value indicating the slip sheet ID of a slip sheet ejected immediately before a re-formed page after a page having a detected defect.

The value of the item "RELATION OF POSITIONS OF DEFECT DETECTED PAGE AND SLIP SHEET" is a value indicating the relation between the position of the printed page on which the defect is detected and the position at which the slip sheet is stacked. The relation of positions of the defect detected page and the slip sheet indicates the number of sheets that are sandwiched between the slip sheets and the defect detection face of the defect detected page (upper face or lower face). Note that the "DEFECT DETECTION PAGE LIST" display area 909 displaying the defect detection page list may further display identification information of the defective sheet such as the page ID or the sheet ID, or information included in the job information of FIG. 8 such as the job ID, in association with each defect detection sheet.

Figure 19:
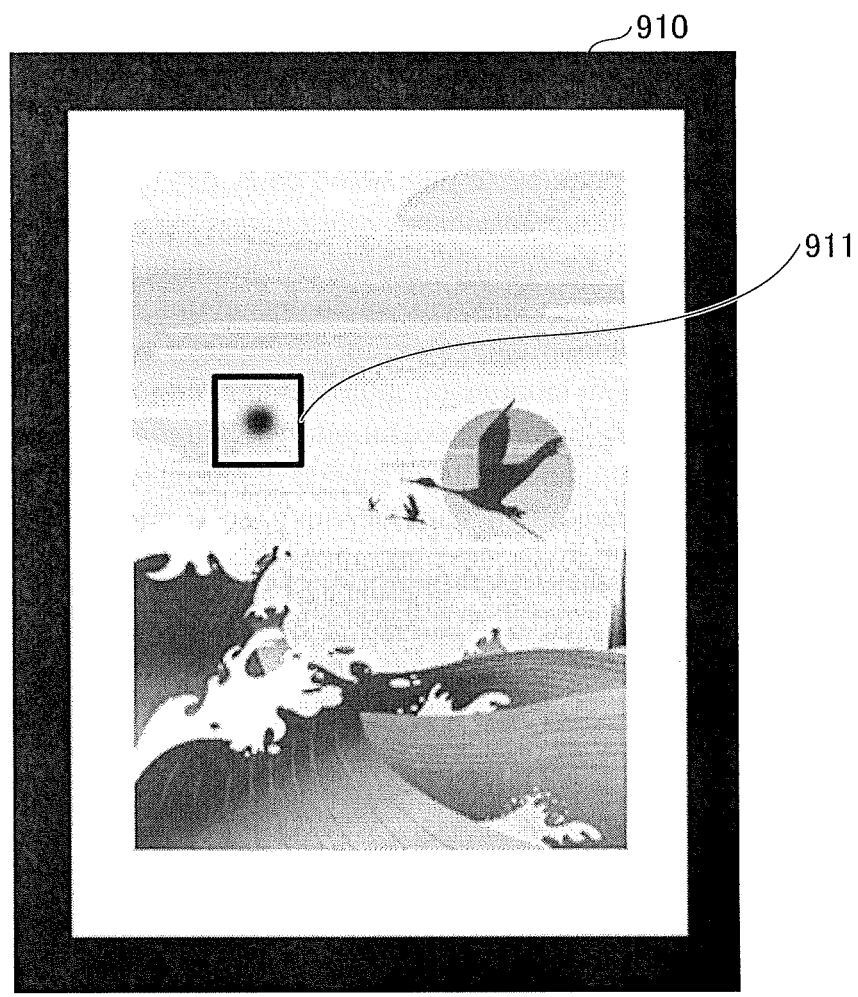
FIG. 19 is a diagram illustrating an example of a defect detection image.

FIG. 19 is a diagram illustrating an example of a defect detection image.

The "DEFECT DETECTION IMAGE" display area 910 in FIG. 19 displays read image data of a printed page designated in the defect detection page list illustrated in FIG. 17 to which a display 911 indicating the defect detection portion is added.

In other words, the inspection device 13 is configured to control display of information indicating a relation of stacking positions between the first conveyance medium and the third conveyance medium. A user checks the defect display screen and grasps the relation of the positions of the defect detected page and the slip sheet. As a result, the user easily finds a page in which a defect has been detected, and the load of operation of replacing the page having the detected defect with a page having a reproduced image is reduced.

When the separation position is not designated as in the currently disclosed technique, manual replacement is constantly performed at the time of reprinting. As a result, the user cannot leave the printer 11 to spend the effort dedicated to the printer 11. According to the image forming system 1 of the present embodiment, since the user can find where to replace the printer 11 later, the user may leave the printer 11 and the effort is not spent to the printer 11 alone.

According to the image forming system 1 of the present embodiment, the user is prompted to re-form an image at a convenient portion such as a separation of a job or a separation of a copy. As a result, once a bundle of conveyance media on which images have been formed is completed as one booklet, then the user replaces the pages that are to be replaced.

Further, information of a page having a re-formed image is printed on a slip sheet. Thus, the user confirms which page is to be replaced, and the replacement operation is facilitated.

Second Embodiment

Next, descriptions are given of an image forming system 1 according to a second embodiment of the present disclosure, with reference to the drawings. The configuration of the image forming system 1 according to the second embodiment is basically similar to the configuration of the image forming system 1 according to the first embodiment. Different from the first embodiment, the configuration of the image forming system 1 according to the second embodiment includes a function of re-forming an image when the defect is detected instead of a separation position, for example such as the timing when immediately after a defect is detected. Thus, in the following description of the second embodiment, differences from the first embodiment are mainly described. The components of the second embodiment having the same functional configurations as the components of the first embodiment are denoted by the same reference numerals used in the description of the first embodiment, and descriptions of the components similar to the first embodiment are omitted in the second embodiment.

Figure 20:
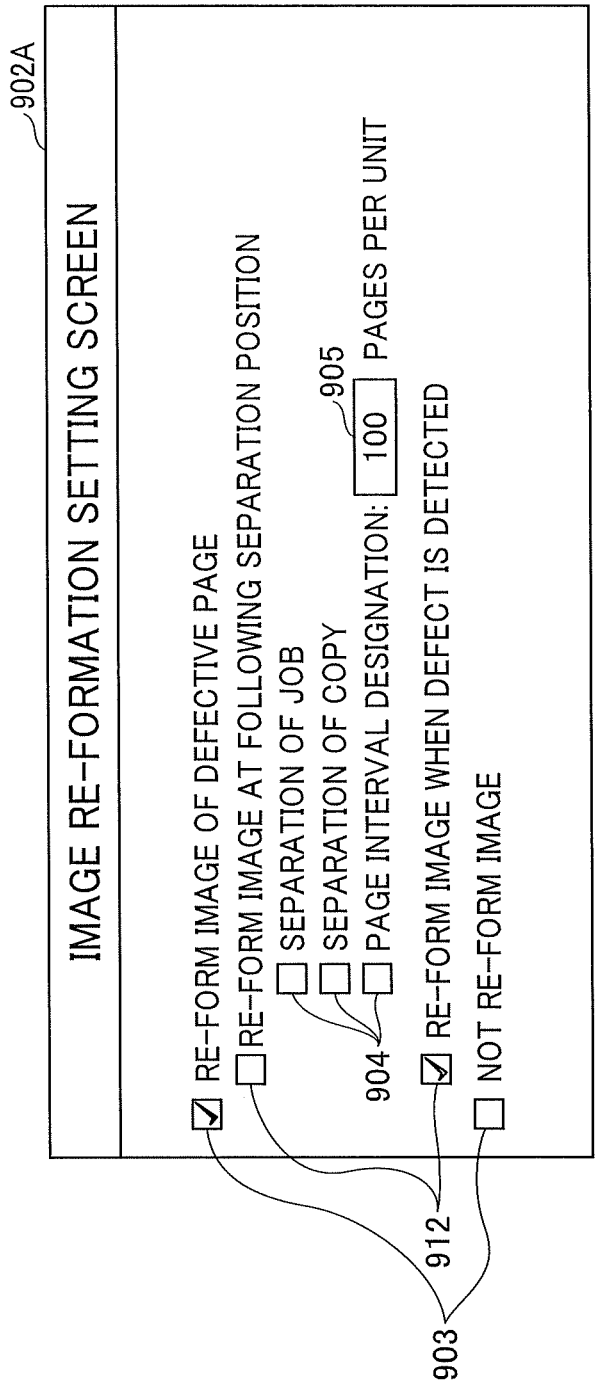
FIG. 20 is a diagram illustrating the image re-formation setting screen, according to a second embodiment of the present disclosure.

FIG. 20 is a diagram illustrating the image re-formation setting screen, according to the second embodiment of the present disclosure.

An image re-formation setting screen 902A according to the present embodiment further includes a re-formation timing selection button 912 in addition to the image re-formation setting screen 902 according to the first embodiment.

The re-formation timing selection button 912 is a GM to select a timing at which an image is re-formed. Specifically, a user selects whether to re-form an image at a separation position (the same configuration as the first embodiment) or to re-form the image when a defect is detected (the present embodiment). When the option "re-form an image when a defect is detected" is selected, re-forming the image is executed or started, for example, immediately after detecting a defect without waiting for a separation position.

Figure 21:
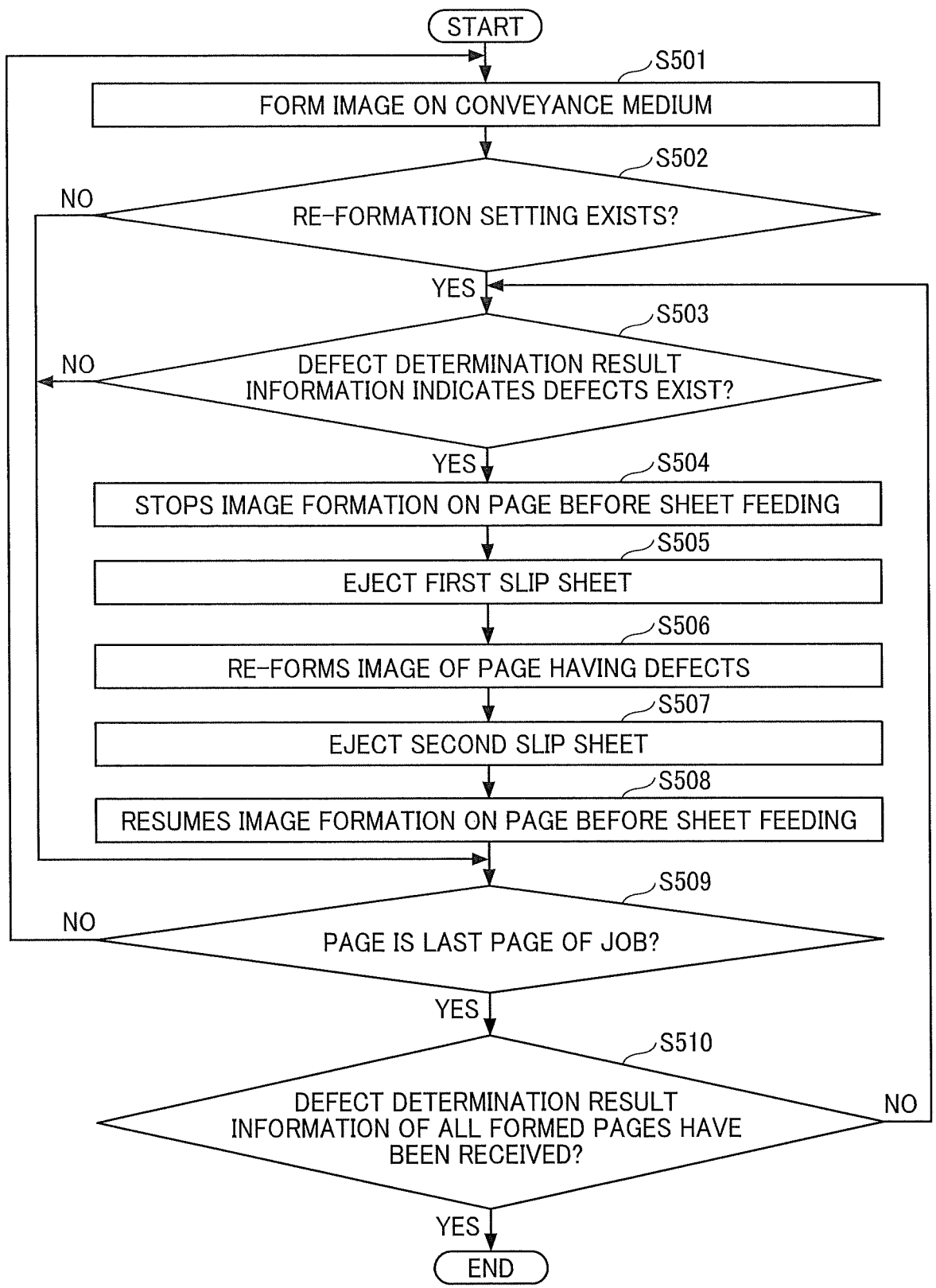
FIG. 21 is a flowchart of an image formation process, according to the second embodiment of the present disclosure.

FIG. 21 is a flowchart of the image formation process, according to the second embodiment of the present disclosure.

As the image forming process according to the first embodiment, when the job information processing unit 211 of the printer 11 processes the job information received from the DFE 50, the image processing control unit 208, the printing control unit 209, and the mechanism control unit 206 form an image on the conveyance medium, in step S501. The printer 11 executes the following processing for each page included in the print job.

In step S502, the stop control unit 214 determines whether the image re-formation is set, based on the setting information indicating the image re-formation setting.

When the stop control unit 214 determines that the image re-formation is not set (NO in step S502), the printer 11 skips the processes from step S503 to step S508 and executes the process of step S509.

When the stop control unit 214 determines that the image re-formation is set (YES in step S502), the stop control unit 214 determines whether the defect determination result information received from the inspection device 13 indicates that the image includes a defect in step S503.

When the stop control unit 214 determines that the defect determination result information indicates that the image includes a defect (YES in step S503), the stop control unit 214 stops image formation on a page before the sheet is fed in step S504. Specifically, the stop control unit 214 instructs the job information processing unit 211 to stop processing of job information of a page before the sheet is fed. Since a page that has already been fed cannot be stopped, images are formed on several pages following the page having a detected defect.

Subsequently, when the slip sheet request information received from the inspection device 13 indicates that the slip sheet is to be printed, the printer 11 ejects a first slip sheet in step S505. Specifically, the job information generation unit 213 generates job information to print the slip sheet. Then, the job information processing unit 211 processes the generated job information. As a result, the printer 11 prints and ejects the slip sheet.

Subsequently, when the re-formation request information indicates that the re-formation is to be executed, the printer 11 re-forms an image of the page having a defect in step S506. Specifically, the job information generation unit 213 generates job information to re-form an image. Then, the job information processing unit 211 processes the generated job information. As a result, the printer 11 re-forms the image determined as a defective image.

Subsequently, in step S507, when the slip sheet request information indicates that the slip sheet is to be printed, the printer 11 ejects a second slip sheet. As a result, the printer 11 prompts a user to find a re-formed conveyance medium by ejecting the second slip sheet.

Subsequently, in step S508, the stop control unit 214 resumes the image formation on the page before the sheet is fed. Specifically, the stop control unit 214 instructs the job information processing unit 211 to cancel the stop of the processing of the job information of the page before the sheet is fed.

When the stop control unit 214 determines that the defect determination result information indicates the image does not include a defect (NO in step S503), the printer 11 skips the processes from step S504 to step S508 and executes the process of step S509.

Following the processing of step S508, the stop control unit 214 determines whether the page is the last page of the print job, in step S509. When the stop control unit 214 determines that the page is not the last page of the print job (NO in step S509), the stop control unit 214 returns to the process of step S501 and proceeds to the process for the following page.

When the stop control unit 214 determines that the page is the last page of the print job (YES in step S509), the stop control unit 214 determines whether the defect determination result information of the whole formed pages has been received.

Note that the whole formed pages are the whole pages included in the print job. Since the defect determination result information is transmitted at any time in accordance with the progress of the defect determination process of the inspection device 13, the defect determination result information of the whole pages included in the print job may not be transmitted even when the formation of the image of the last page is completed. Then, the stop control unit 214 determines whether the defect determination result information of the whole formed pages has been received.

When the stop control unit 214 determines that there is a page that the defect determination result information has not been received yet (NO in step S510), the stop control unit 214 returns to the process of step S503 to wait until the defect determination result information is received.

Figure 22:
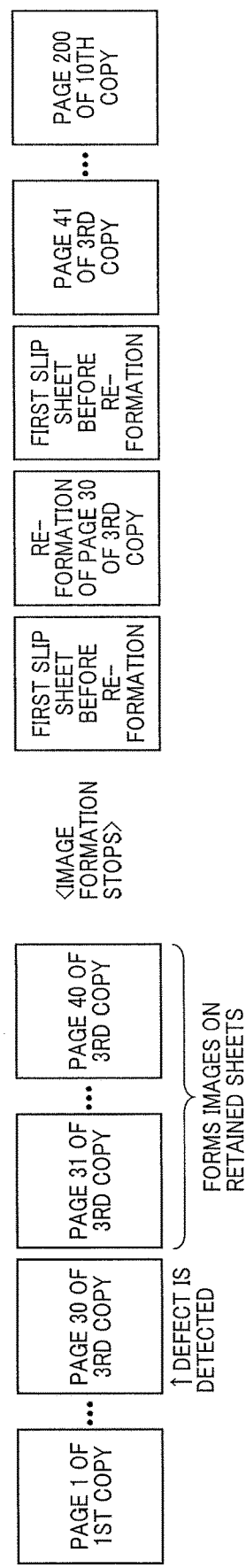
FIG. 22 is a diagram illustrating a result of the image re-formation, according to the second embodiment of the present disclosure.

FIG. 22 is a diagram illustrating a result of the image re-formation, according to the second embodiment of the present disclosure.

FIG. 22 illustrates the sequence of image re-formation when a defect is detected on the 30th page of the 3rd copy of a print job for printing 10 copies of an image of 200 pages and "print process with image re-formation" is selected by the image re-formation selection button 903 on the image re-formation setting screen 902A and "re-form an image when a defect is detected" is selected by the re-formation timing selection button 912.

The printer 11 does not stop forming an image at the end of each copy. Then, when the inspection device 13 determines that the image includes a defect based on the read image data obtained by reading the image of the 30th page of the 3rd copy, the inspection device 13 stops the formation of the images of the 41st page and subsequent pages of the 3rd copy that the sheet has not been fed yet at that time. Then, the printer 11 ejects the first slip sheet after forming the images of up to the 40th page of the 3rd copy retained in the housing of the printer 11. Subsequently, the printer 11 re-forms the image of the 30th page of the 3rd copy in which the defect is detected, then ejects the second slip sheet. Then, the printer 11 resumes the formation of images of the 41st page and subsequent pages of the 3rd copy.

Figure 23:
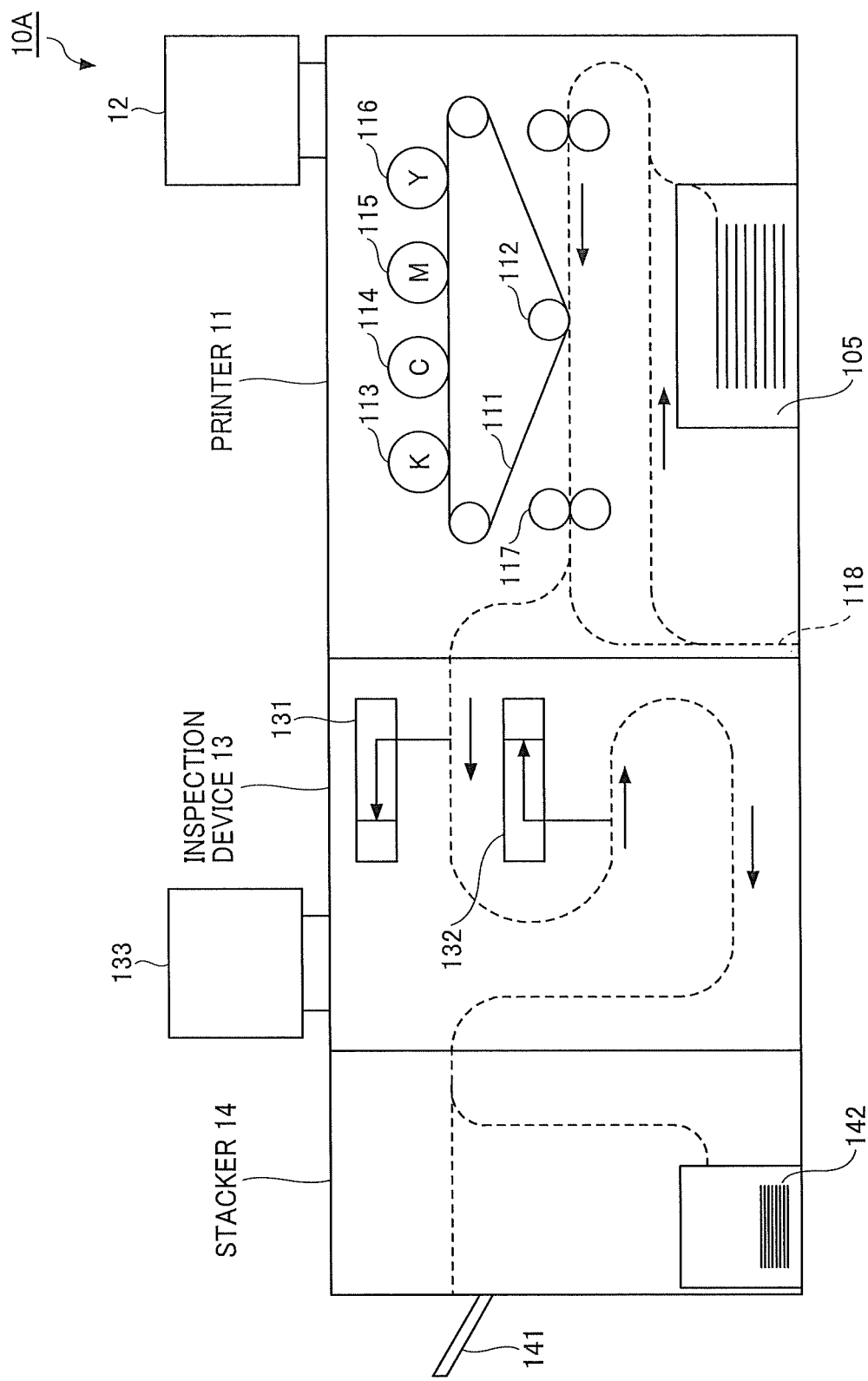
FIG. 23 is a diagram illustrating a hardware configuration of the image forming apparatus, according to a modification of the second embodiment of the present disclosure.

FIG. 23 is a diagram illustrating a hardware configuration of the image forming apparatus, according to a modification of the second embodiment of the present disclosure.

The image forming apparatus 10A according to the present embodiment may further include a purge tray 142. The purge tray 142 is an example of an ejection destination in order to discard a sheet by ejecting the sheet having a problem such as a defect to a place other than the sheet ejection tray 141. The image forming apparatus 10A may eject the sheet having a detected defect to the purge tray 142, eject the sheet having a re-formed image to the sheet ejection tray 141, and replace the sheet including a page having a detected defect with the sheet on which the image is re-formed.

Further, the image forming apparatus 10A may eject the sheet that has already been fed after a defect is detected and before the image of the page having the detected defect is re-formed, to the purge tray 142, regardless of the detected defect. In this case, the image forming apparatus 10A may collectively replace the images of the pages included in the sheet that has already been fed, by re-forming and ejecting together with the images of the pages having the detected defect. As a result, the image forming apparatus 10A collectively replace a page having a detected defect and a page included in the sheet fed before re-forming in a correct page order.

Figure 24:
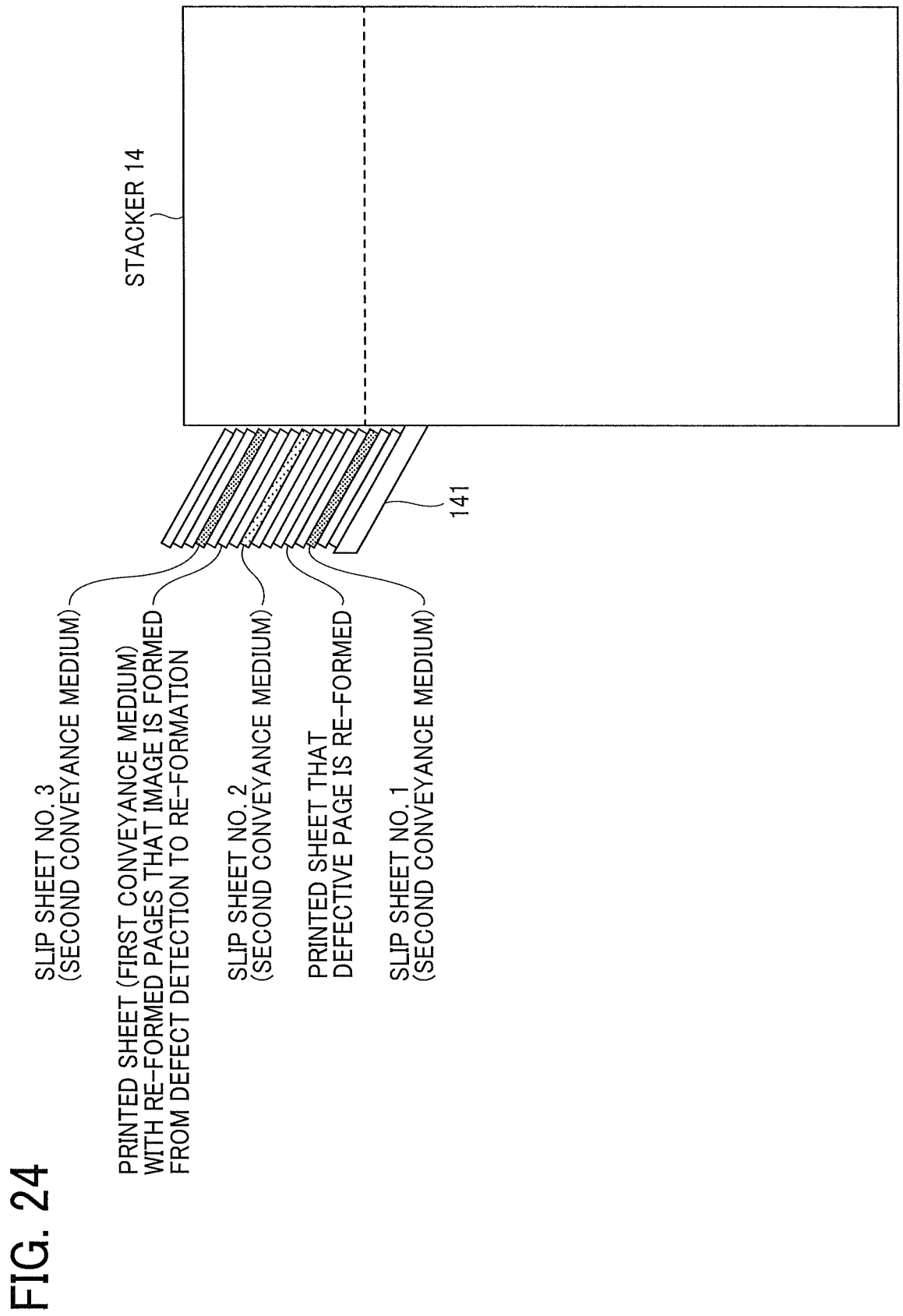
FIG. 24 is a diagram illustrating a method of ejecting slip sheets, according to the modification of the second embodiment.

FIG. 24 is a diagram illustrating a method of ejecting slip sheets, according to the modification of the second embodiment. A slip sheet No. 1 is a sheet indicating the start of re-formation in printed materials. A slip sheet No. 2 is a sheet serving as a partition between a sheet having a re-formed image due to a defective page and a sheet fed before the re-formation of the defective page, in the re-formed sheets of the printed materials. A slip sheet No. 3 is a sheet indicating the end of re-formation in the printed materials.

As described above, the image forming apparatus 10A may allow a user to select a position where a slip sheet is to be inserted when sheets including a page having a detected defect and a page or pages fed before re-formation are collectively replaced. For example, a position where a slip sheet is to be inserted into the printed materials in the sheet ejection tray 141 may be selectable from optional positions on the setting screen and each slip sheet may be output at the selected position. The optional positions may include, for example, a position under the sheet on which an image of a defect detected page is re-formed (before the re-formed portion of the printed materials), a position between the sheet on which the image of a defect detected page is re-formed and a sheet on which an image of a page included in a sheet fed before re-formation is re-formed (middle of the re-formed portion of the printed materials), and a position after the sheet on which the image of the page included in the sheet fed before re-formation is re-formed (after the re-formed portion of the printed materials).

According to the image forming system 1 of the present embodiment, when a defect is detected in an ongoing print job, an image is re-formed in accordance with the re-forming timing selected by the user. Specifically, instead of the designation of the separation position according to the first embodiment of the present disclosure, the slip sheet is ejected before or after the conveyance medium on which the image has been re-formed. As a result, the user easily determines the position of the conveyance medium on which the image has been re-formed. In addition, since the print process is not stopped at the separation position, a decrease in printing speed is reduced.

Third Embodiment

Next, descriptions are given of an image forming system 1 according to a third embodiment of the present disclosure, with reference to the drawings. The configuration of the image forming system 1 according to the third embodiment is basically similar to the configuration of the image forming system 1 according to the first embodiment. Different from the first embodiment, the configuration of the image forming system 1 according to the third embodiment causes the inspection device 13 transmits defect determination result information at a timing corresponding to a separation position set in the printer 11. Thus, in the following description of the third embodiment, differences from the first embodiment are mainly described. The components of the third embodiment having the same functional configurations as the components of the first embodiment are denoted by the same reference numerals used in the description of the first embodiment, and descriptions of the components similar to the first embodiment are omitted in the third embodiment.

Figure 25:
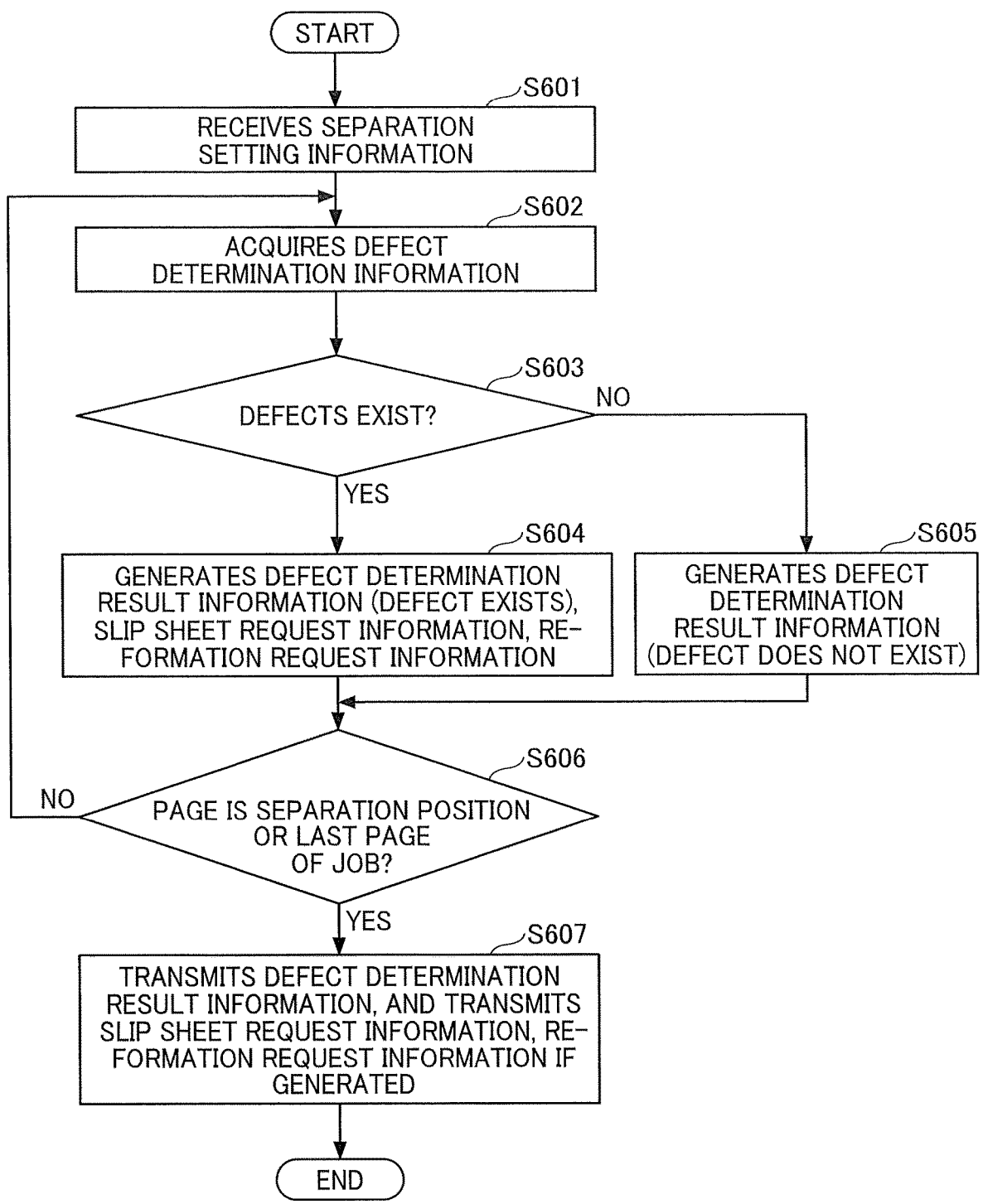
FIG. 25 is a flowchart of a defect determination process, according to a third embodiment of the present disclosure.

FIG. 25 is a flowchart of the defect determination process, according to a third embodiment of the present disclosure.

In step S601, the re-forming determination unit 315 receives separation setting information from the inspection device 13. The separation setting information is information indicating setting of a selected separation position. Since the inspection device 13 receives and stores the separation setting information each time the setting is changed in the printer 11, the inspection device 13 may not receive the separation setting information when the defect determination process is performed.

Subsequently, in step S602, the re-forming determination unit 315 acquires the defect determination information. The inspection device 13 executes processing for each target page. In step S603, the re-forming determination unit 315 determines the presence or absence of the defect with reference to the defect determination result included in the defect determination information. When the re-forming determination unit 315 determines that the image includes a defect (YES in step S603), the ejection determination unit 314 determines whether to eject a slip sheet based on a condition set in advance and generates slip sheet request information indicating the determination result. Further, the re-forming determination unit 315 determines whether to re-form an image based on a condition set in advance and generates re-formation request information indicating the determination result. Then, in step S604, the inspection device 13 generates the defect determination result information indicating that image includes a defect, the slip sheet request information, and the re-formation request information.

When the re-forming determining unit 315 determines that the image does not include a defect (NO in step S603), the inspection device 13 generates the defect determination result information indicating that image does not include a defect in step S605.

Following step S604 or step S605, the inspection device 13 determines whether the page to be an object of the defect determination process is a separation position or the last page of the print job, in step S606. When the inspection device 13 determines that the page to be an object of the defect determination process is not the separation position and is not the last page of the print job (NO in step S606), the inspection device 13 returns to the process of step S602 and executes the process of the next page.

When the inspection device 13 determines that the page to be subjected of the defect determination process is the separation position or the last page of the print job (YES in step S606), the inspection device 13 transmits the generated defect determination result information, the slip sheet request information (when generated), and the re-formation request information (when generated), to the printer 11 in step S607.

Figure 26:
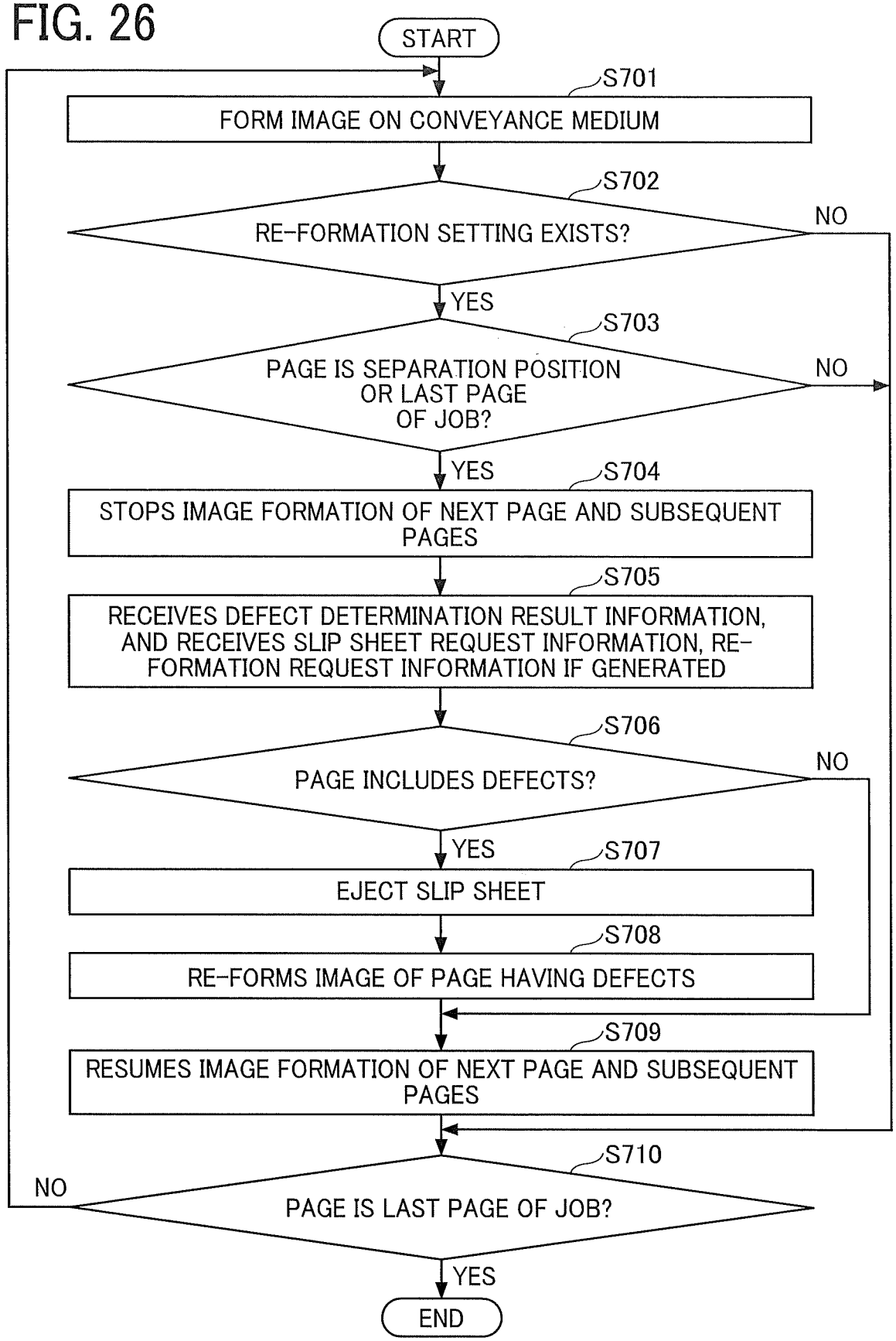
FIG. 26 is a flowchart of an image formation process, according to the third embodiment of the present disclosure.

FIG. 26 is a flowchart of the image formation process, according to the third embodiment of the present disclosure.

The processing from step S701 to step S704 of the image forming process according to the present embodiment is the same as the processing from step S401 to step S404, respectively, of the image forming process according to the first embodiment. Following the processing of step S704, the printer 11 receives the defect determination result information, the slip sheet request information (when transmitted), and the re-formation request information (when transmitted), in step S705. Since the defect determination result information is to be transmitted in accordance with the setting of the separation position, the printer 11 according to the present embodiment waits until the defect determination result information is received.

The processing from step S706 to step S710 of the image forming process according to the present embodiment is the same as the process from step S406 to step S410 of the image forming process according to the first embodiment.

According to the image forming system 1 of the present embodiment, the inspection device 13 transmits the defect determination result information, the slip sheet request information, and the re-formation request information to the printer 11 in accordance with the separation position. Due to such a configuration, the number of communication times and the amount of communication are reduced, and the load on the communication process and the communication line are reduced compared to a case where the information is transmitted for each page.

Each of the above-described embodiments describes the examples in which the image forming apparatus 10 prints the slip sheet. As a result, generating a slip sheet with an outstanding color tone using inexpensive sheets is achieved, configuration changes such as changes in color patterns is flexibly achieved, and saving the effort of separately preparing sheets for the slip sheet. Pre-printed sheets or materials other than sheets may be ejected as a third conveyance medium. For example, the slip sheet ID may be written in a bundle of the plurality of sheets, the plurality of sheets may be placed on the sheet feeding tray so as to be ejected in the order of the slip sheet IDs, and the slip sheet fed from the sheet feeding tray may be inserted into the printed sheets. As a result, the printing cost of the slip sheet is reduced.

In each of the above-described embodiments, the DFE 50, the inspection device 13 and the printer 11 are configured to share the above-described processing steps in various combinations. Further, the elements of the DFE 50, the inspection device 13 and the printer 11 may be integrated into one apparatus or may be separately disposed in a plurality of different apparatuses.

For example, the above-described embodiments describe the examples in which the inspection device 13 determines whether the slip sheet is printed and whether re-formation is performed. However, the printer 11 may determine whether the slip sheet is printed and whether re-formation is performed. In addition, the above-described embodiments describe the examples in which the printer 11 receives the selection of the re-formation setting and controls the re-formation. However, the inspection device 13 may receive the selection of the re-formation setting and may execute processing of controlling the re-formation.

Each of the above-described embodiments describes the examples in which the stop control unit 214 controls to stop formation of an image on a first conveyance medium (conveyed after the selection of the re-formation setting is received) at a selected timing and resume formation of the image that has been stopped when re-formation on a second conveyance medium is performed. However, when the re-formation is executed, the stop control unit 214 may determine whether an image of the re-formed second conveyance medium has a defect. When the image of the re-formed second conveyance medium does not have a defect, the stop control unit 214 may restart the formation of the image of the stopped first conveyance medium. When the image of the re-formed second conveyance medium has a defect, the stop control unit 214 may stop the image formation. In addition, when the re-formation is performed, the stop control unit 214 may resumes the formation of the image of the first conveyance medium which has been stopped regardless of whether the image of the second conveyance medium which has been re-formed, has a defect.

In an embodiment, the DFE 50 or the inspection device 13 may be configured as an information processing system including a plurality of computing devices such as a server cluster. The plurality of computing devices is configured to communicate with one another via any type of communication link, including a network or shared memory to implement the processing described in the present invention.

In the above-described embodiments, the stacker 14 includes one sheet ejection tray 141. However, in other embodiments, the stacker 14 may include the plurality of sheet ejection trays 141. For example, the stackers 14 and the sheet ejection trays 141 illustrated in FIGS. 27 and 28 are configured to eject and stack the printed sheets and the slip sheets. In the ejecting and stacking method illustrated in FIG. 27, the printed sheets, a defective printed sheet, a sheet before re-forming, a re-formed printed sheet, and a separation sheet are collectively ejected to one sheet ejection tray 141. Thus, even in this state, the printed sheets, the defective printed sheet, the slip sheet before re-forming, the re-formed printed sheet, and the separation sheet, ejected for each copy, are easily distinguished from each other.

Further, when the sheets are collectively ejected to one sheet ejection tray, the plurality of printed sheets having defects are included across the plurality of jobs that are continuously ejected or a plurality of copies of the same job. However, the user easily grasps the position of the defective sheet by ejecting the plurality of slip sheets distinguished from each other even if a relatively large number of sheets is ejected. In addition, as illustrated in FIG. 28, a plurality of sheet ejection trays 141 may be used to be ejected the printed sheets, the defective printed sheet, the slip sheet before re-forming, the re-formed printed sheet, and the separation sheet for each copy. Note that the printed sheets, the defective printed sheet, and the slip sheet before re-forming related to the defective printed sheet, the re-formed printed sheet, and the separation sheet may be ejected across the plurality of sheet ejection trays. The slip sheet ejected to the upper sheet ejection tray of the plurality of sheet ejection trays 141 may indicate presence of defective printed sheets ejected to the lower sheet ejection tray of the plurality of sheet ejection trays 141.

In this case, as illustrated in FIG. 28, when the slip sheet before re-forming, the re-formed printed sheet, and the separation sheet are ejected to the uppermost position of the sheet ejection trays 141, the re-formed printed sheet is easily confirmed by turning over the separation sheet. In addition, in the case where sheets are separately ejected to the corresponding trays of the plurality of sheet ejection trays 141, the display control unit 302 may display identification information (tray A, tray B) of the ejected sheet ejection tray 141 or the level of the sheet ejection tray (the first tray from the top, the second tray from the top) for each cover of printed sheets with defects so as to indicate one sheet ejection tray 141 to which the sheets with defects are ejected and another sheet ejection tray 141 to which slip sheets are ejected.

According to the image forming system 1 of the present embodiment, since the selection of the timing for re-forming the image having the detected defect is received, a user is prompted to grasp that the re-formed second conveyance medium is ejected at a position (end of copy or end of job) corresponding to the timing set in advance. As a result, when the user checks the re-formed second conveyance medium in the vicinity of the sheet ejection tray even if relatively a large number of conveyance media are ejected and stacked, the user easily reaches the second conveyance medium to be checked, then efficiency of the printing operation is increased.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming apparatus comprising:
   processing circuitry configured to:
   receive a timing selected for re-forming an image determined to be defective based on information about the image formed on a first conveyance medium;
   stop image formation on another first conveyance medium subsequent to the first conveyance medium at the selected timing;
   re-form the image determined to be defective on a second conveyance medium at the selected timing; and
   determine whether there-formed image on the second conveyance medium is defective, wherein
   the image formation on the other first conveyance medium is resumed in a case where it is determined that the re-formed image is not defective; and
   the image formation on the other first conveyance medium is stopped in a case where it is determined that the re-formed image is defective.

2. The image forming apparatus according to claim 1, wherein the processing circuitry is further configured to:

resume the image formation on the other first conveyance medium, regardless of whether the re-formed image on the second conveyance medium is defective.

3. The image forming apparatus according to claim 1, wherein options of the timing for re-forming the image include selection of a separation position, and
wherein the processing circuitry is configured to re-form the image on the second conveyance medium at the selected separation position.

4. The image forming apparatus according to claim 3, wherein options of the separation position include any one of a separation of job, a separation of copy, and a page interval designation.

5. The image forming apparatus according to claim 1, wherein the processing circuitry is further configured to perform control of ejecting a third conveyance medium before ejection of the second conveyance medium bearing the re-formed image determined to be defective is re formed.

6. The image forming apparatus according to claim 5, wherein the processing circuitry is further configured to perform control of forming information of a page including the image determined to be defective, on the third conveyance medium.

7. The image forming apparatus according to claim 1, wherein options of the timing for re-forming the image include an option of re-forming the image in response to a detection of a defect in the image, and
wherein the processing circuitry is configured to re-form the image on the second conveyance medium in response to the detection of a defect in the image, in a case where the option of re-forming the image in response to the detection of a defect in the image is selected.

8. The image forming apparatus according to claim 7, wherein the processing circuitry is further configured to perform control of ejecting a third conveyance medium before and after ejection of the second conveyance medium bearing the re-formed image, in a case where the option of re-forming the image in response to the detection of a defect in the image is selected.

9. An image forming apparatus comprising:
an inspection device including
a sensor configured to acquire information about an image formed on a first conveyance medium, and
a first processing circuitry configured to determine whether the image formed on the first conveyance medium is defective, based on the information acquired by the sensor; and
a printer including
a second processing circuitry configured to:
receive a timing selected for re-forming the image in a case where the first processing circuitry determines that the image is defective;
stop image formation on another first conveyance medium subsequent to the first conveyance medium at the selected timing;
re-form the image determined to be defective by the first processing circuitry, on a second conveyance medium at the selected timing; and
determine whether the re-formed image on the second conveyance medium is defective, wherein the image formation on the other first conveyance medium is resumed in a case where it is determined that the re-formed image is not defective; and
the image formation on the other first conveyance medium is stopped in a case where it is determined that the re-formed image is defective.

10. The image forming apparatus according to claim 9, wherein the second processing circuitry is further configured to perform control of ejecting a third conveyance medium before ejection of the second conveyance medium, and
wherein the first processing circuitry is further configured to control display of information indicating a relation of stacking positions between the first conveyance medium and the third conveyance medium ejected by the control of the second processing circuitry.

11. The image forming apparatus according to claim 10, wherein the first processing circuitry is further configured to:
obtain determination result information on whether each image of a plurality of images formed on a corresponding page of a plurality of pages of the first conveyance medium is defective; and
transmit the determination result information for each page to the printer, wherein the second processing circuitry is configured to:
stop image formation at the selected timing,
determine whether the determination result information indicates a page having a defect is included in the plurality of pages of the first conveyance medium;
eject the third conveyance medium in a case where the second processing circuitry determines the page having the defect is included in the plurality of pages of the first conveyance medium;
re-form the image on the page determined as having the defect, the image being re-formed on the second conveyance medium; and
resume the stopped image formation.

12. The image forming apparatus according to claim 11, wherein options of the timing for re-forming the image include a selection of a separation position, and
wherein the second processing circuitry is further configured to wait until the determination result information of all pages of the plurality of pages of the first conveyance medium on which the plurality of images have been formed is obtained for each separation position, in a case where the separation position is selected as the timing for re-forming the image.

13. The image forming apparatus according to claim 12, wherein the first processing circuitry is configured to:
receive information indicating the selected separation position; and
transmit the determination result information to the printer for each selected separation position.

14. An image forming method to be performed by a computer, the image forming method comprising:
reading an image formed on a first conveyance medium to obtain read image data;
determining whether the image formed on the first conveyance medium is defective, based on the read image data;
receiving a timing selected for re-forming the image in a case where it is determined that the image is defective; and
stopping image formation on another first conveyance medium subsequent to the first conveyance medium at the selected timing;
re-forming the image determined to be defective on a second conveyance medium at the selected timing; and determining whether the re-formed image on the second conveyance medium is defective, wherein
the image formation on the other first conveyance medium is resumed in a case where it is determined that the re-formed image is not defective; and
the image formation on the other first conveyance medium is stopped in a case where it is determined that the re-formed image is defective.

15. A non-transitory storage medium storing computer-readable program code that, when executed by a computer, causes the computer to execute:
reading an image formed on a first conveyance medium to obtain read image data;
determining whether the image formed on the first conveyance medium is defective, based on the read image data;
receiving a timing selected for re-forming the image in a case where it is determined that the image is defective; and
stopping image formation on another first conveyance medium subsequent to the first conveyance medium at the selected timing;
re-forming the image determined to be defective on a second conveyance medium at the selected timing; and
determining whether the re-formed image on the second conveyance medium is defective, wherein
the image formation on the other first conveyance medium is resumed in a case where it is determined that the re-formed image is not defective; and
the image formation on the other first conveyance medium is stopped in a case where it is determined that the re-formed image is defective.

* * * * *